US012432392B1

(12) United States Patent
Raimondo et al.

(10) Patent No.: US 12,432,392 B1
(45) Date of Patent: Sep. 30, 2025

(54) GOLF EVENT BROADCAST PRODUCTION SYSTEM

(71) Applicant: PGA TOUR Enterprises, LLC, Ponte Vedra Beach, FL (US)

(72) Inventors: Michael Raimondo, Ponte Vedra Beach, FL (US); Anthony Renda, Ponte Vedra Beach, FL (US); Luis Goicouria, Ponte Vedra Beach, FL (US); Scott Gutterman, Ponte Vedra Beach, FL (US); David Dukes, Ponte Vedra Beach, FL (US); Eric Hanson, Ponte Vedra Beach, FL (US); Greg Hopfe, Ponte Vedra Beach, FL (US)

(73) Assignee: PGA TOUR Enterprises, LLC, Ponte Vedra Beach, FL (US)

( * ) Notice: Subject to any disclaimer, the term of this patent is extended or adjusted under 35 U.S.C. 154(b) by 0 days.

(21) Appl. No.: 18/813,325

(22) Filed: Aug. 23, 2024

(51) Int. Cl.
| | |
|---|---|
| *H04N 21/218* | (2011.01) |
| *H04N 21/43* | (2011.01) |
| *H04N 21/61* | (2011.01) |
| *H04N 21/81* | (2011.01) |

(52) U.S. Cl.
CPC . *H04N 21/21805* (2013.01); *H04N 21/43072* (2020.08); *H04N 21/6125* (2013.01); *H04N 21/8133* (2013.01); *H04N 21/8146* (2013.01)

(58) Field of Classification Search
CPC ....... H04N 21/21805; H04N 21/43072; H04N 21/6125; H04N 21/8133; H04N 21/8146
See application file for complete search history.

(56) References Cited

U.S. PATENT DOCUMENTS

| | | | |
|---|---|---|---|
| 5,364,093 | A | 11/1994 | Huston |
| 5,562,550 | A | 10/1996 | Chartrand |
| 5,685,786 | A | 11/1997 | Dudley |
| 5,740,077 | A | 4/1998 | Reeves |
| 5,984,798 | A | 11/1999 | Gilmour |

(Continued)

FOREIGN PATENT DOCUMENTS

| | | | | |
|---|---|---|---|---|
| EP | 0710494 A1 | 5/1996 | | |
| EP | 2515548 A1 | * 10/2012 | ......... | H04N 21/2187 |

(Continued)

OTHER PUBLICATIONS

International Search Report issued Mar. 30, 2023 in connection with PCT Application No. PCT/US23/10229.

(Continued)

*Primary Examiner* — Fernando Alcon
(74) *Attorney, Agent, or Firm* — Akerman LLP

(57) ABSTRACT

A production platform may include a production processor that receives live feeds of media data captured from the golf event and perform switching operations between camera sources according to a production algorithm utilizing golf tracking data collected by sensors of a tracking system to produce live programs of players or player groups competing in the golf event. Production elements may be grouped and recalled for incorporation into a production interface enabling a single operator to produce a program covering a group for a full round. The programs may be streamed to program recipients for consumption and live broadcast viewing. Production and distribution may be performed in a cloud computing environment.

30 Claims, 16 Drawing Sheets

(56) References Cited

U.S. PATENT DOCUMENTS

| | | | | |
|---|---|---|---|---|
| 6,162,129 | A | 12/2000 | Nielsen | |
| 6,456,938 | B1 | 9/2002 | Barnard | |
| 8,355,903 | B1* | 1/2013 | Birnbaum | G06Q 10/10 706/46 |
| 8,517,854 | B2 | 8/2013 | Jung | |
| 9,028,344 | B2 | 5/2015 | Baker et al. | |
| 9,298,986 | B2* | 3/2016 | Ferlatte | G06V 20/42 |
| 9,460,242 | B2 | 10/2016 | Kamino | |
| 10,325,410 | B1* | 6/2019 | Smith | G06T 11/00 |
| 10,478,706 | B2 | 11/2019 | O'Connor et al. | |
| 11,582,522 | B1* | 2/2023 | Mahyar | H04N 21/4532 |
| 11,607,601 | B1 | 3/2023 | Lovell et al. | |
| 11,745,084 | B1 | 9/2023 | Lovell et al. | |
| 11,872,464 | B1 | 1/2024 | Vitti et al. | |
| 11,986,699 | B1 | 5/2024 | Walker et al. | |
| 11,998,829 | B2 | 6/2024 | Lovell et al. | |
| 12,161,913 | B2 | 12/2024 | Walker et al. | |
| 12,179,085 | B2 | 12/2024 | Vitti et al. | |
| 2001/0030667 | A1 | 10/2001 | Kelts | |
| 2001/0035880 | A1 | 11/2001 | Musatov | |
| 2002/0004723 | A1 | 1/2002 | Meifu | |
| 2002/0151994 | A1 | 10/2002 | Sisco | |
| 2002/0161461 | A1 | 10/2002 | Lobb | |
| 2003/0191547 | A1 | 10/2003 | Morse | |
| 2004/0007617 | A1 | 1/2004 | Shaw et al. | |
| 2005/0096761 | A1 | 5/2005 | Hanover et al. | |
| 2005/0101415 | A1 | 5/2005 | Sweeney | |
| 2005/0172323 | A1 | 8/2005 | Yang et al. | |
| 2005/0227791 | A1 | 10/2005 | McCreary et al. | |
| 2006/0247807 | A1 | 11/2006 | Bernstein et al. | |
| 2007/0129178 | A1 | 6/2007 | Reeves | |
| 2007/0167247 | A1 | 7/2007 | Lindsay | |
| 2008/0065740 | A1 | 3/2008 | Baio et al. | |
| 2008/0068511 | A1* | 3/2008 | Yeh | G11B 27/28 348/E5.067 |
| 2008/0261711 | A1 | 10/2008 | Tuxen | |
| 2009/0017944 | A1 | 1/2009 | Savarese et al. | |
| 2009/0036237 | A1 | 2/2009 | Nipper et al. | |
| 2009/0222793 | A1 | 9/2009 | Frank et al. | |
| 2010/0332968 | A1 | 12/2010 | Squillace | |
| 2011/0013087 | A1* | 1/2011 | House | H04N 5/2625 348/E5.099 |
| 2012/0004956 | A1 | 1/2012 | Huston | |
| 2012/0238380 | A9 | 9/2012 | Marty et al. | |
| 2012/0322582 | A1 | 12/2012 | Solheim et al. | |
| 2013/0085018 | A1 | 4/2013 | Jensen | |
| 2013/0162467 | A1 | 6/2013 | Winther | |
| 2013/0166048 | A1 | 6/2013 | Werner et al. | |
| 2014/0195675 | A1* | 7/2014 | Silver | H04L 67/02 709/224 |
| 2014/0274240 | A1 | 9/2014 | Meadows | |
| 2014/0317040 | A1 | 10/2014 | Liu et al. | |
| 2014/0365640 | A1 | 12/2014 | Wohl et al. | |
| 2015/0126308 | A1 | 5/2015 | Penn | |
| 2015/0312652 | A1* | 10/2015 | Baker | H04N 21/44008 386/281 |
| 2015/0343292 | A1 | 12/2015 | Leech | |
| 2016/0101358 | A1* | 4/2016 | Ibrahim | G06T 7/292 463/31 |
| 2016/0234566 | A1* | 8/2016 | Suoknuuti | H04N 21/8126 |
| 2016/0234567 | A1* | 8/2016 | Suoknuuti | H04N 21/8456 |
| 2016/0364087 | A1* | 12/2016 | Thompson | H04N 13/351 |
| 2017/0021260 | A1 | 1/2017 | Willett et al. | |
| 2017/0125064 | A1* | 5/2017 | Aggarwal | H04N 5/222 |
| 2017/0178687 | A1* | 6/2017 | Tamir | G11B 27/036 |
| 2017/0250941 | A1 | 8/2017 | Weisberg et al. | |
| 2018/0007448 | A1* | 1/2018 | Gupta | H04N 21/4622 |
| 2018/0120428 | A1 | 5/2018 | Tuxen et al. | |
| 2018/0190077 | A1 | 7/2018 | Hall et al. | |
| 2018/0288496 | A1 | 10/2018 | Ade et al. | |
| 2019/0045258 | A1* | 2/2019 | Egedi | H04N 21/8133 |
| 2019/0089996 | A1* | 3/2019 | Surcouf | H04N 21/23424 |
| 2019/0192951 | A1 | 6/2019 | Rojas et al. | |
| 2019/0255418 | A1 | 8/2019 | Seo | |
| 2019/0267041 | A1* | 8/2019 | Ricciardi | H04N 21/23418 |
| 2019/0299056 | A1 | 10/2019 | Vollbrecht et al. | |
| 2019/0349647 | A1* | 11/2019 | Hall | H04N 21/23412 |
| 2019/0354763 | A1* | 11/2019 | Stojancic | H04N 21/251 |
| 2020/0086200 | A1 | 3/2020 | McCartin | |
| 2020/0107075 | A1* | 4/2020 | Davies | H04N 21/23418 |
| 2020/0164258 | A1 | 5/2020 | Tuxen | |
| 2020/0236288 | A1* | 7/2020 | Schwartz | G06V 20/42 |
| 2020/0269121 | A1 | 8/2020 | Ferras | |
| 2020/0320305 | A1* | 10/2020 | Park | H04N 21/4312 |
| 2021/0037168 | A1* | 2/2021 | Mathur | H04L 65/61 |
| 2021/0089761 | A1 | 3/2021 | Tyomkin | |
| 2021/0113912 | A1 | 4/2021 | Ebert | |
| 2021/0220718 | A1 | 7/2021 | Tuxen et al. | |
| 2021/0228943 | A1 | 7/2021 | Marais et al. | |
| 2021/0295533 | A1 | 9/2021 | DeLeon et al. | |
| 2021/0344972 | A1* | 11/2021 | Burkhart | H04N 21/2187 |
| 2022/0116551 | A1* | 4/2022 | Hiraishi | H04N 21/234345 |
| 2022/0138969 | A1 | 5/2022 | Forsgren et al. | |
| 2022/0176224 | A1 | 6/2022 | Tuxen | |
| 2022/0196783 | A1 | 6/2022 | Dorris et al. | |
| 2022/0219065 | A1 | 7/2022 | Rankin et al. | |
| 2022/0284628 | A1 | 9/2022 | Tuxen et al. | |
| 2022/0296964 | A1 | 9/2022 | Thurner | |
| 2022/0305365 | A1 | 9/2022 | Cunningham-Rhoads et al. | |
| 2022/0319173 | A1* | 10/2022 | Ricciardi | G06V 20/46 |
| 2022/0327830 | A1* | 10/2022 | Chang | H04N 5/268 |
| 2022/0335790 | A1 | 10/2022 | Tucker | |
| 2022/0387873 | A1 | 12/2022 | Hall et al. | |
| 2022/0399042 | A1* | 12/2022 | Beatch | G11B 27/036 |
| 2022/0400202 | A1* | 12/2022 | Imes | H04N 5/77 |
| 2023/0186493 | A1 | 6/2023 | Lee et al. | |
| 2023/0199295 | A1 | 6/2023 | Jansson et al. | |
| 2023/0218948 | A1 | 7/2023 | Yang et al. | |
| 2023/0267736 | A1* | 8/2023 | Green | G06V 20/47 382/103 |
| 2023/0267737 | A1* | 8/2023 | Green | G06V 20/42 382/103 |
| 2023/0306682 | A1 | 9/2023 | Paris et al. | |
| 2023/0381625 | A1* | 11/2023 | Imes | G06V 20/49 |
| 2023/0405438 | A1 | 12/2023 | Lovell et al. | |
| 2024/0017148 | A1 | 1/2024 | Palmgren | |
| 2024/0129599 | A1* | 4/2024 | Basser | H04N 21/235 |
| 2024/0259537 | A1* | 8/2024 | Imes | A63B 24/0006 |
| 2024/0316436 | A1 | 9/2024 | Lovell et al. | |
| 2024/0325859 | A1 | 10/2024 | Lovell et al. | |
| 2024/0416207 | A1 | 12/2024 | Johnson | |
| 2025/0099808 | A1 | 3/2025 | Walker et al. | |

FOREIGN PATENT DOCUMENTS

| | | |
|---|---|---|
| KR | 20040009499 A | 1/2004 |
| KR | 100767292 B1 | 10/2007 |
| KR | 20180131739 A | 12/2018 |
| KR | 20210100723 A | 8/2021 |
| KR | 102436279 B1 | 8/2022 |
| WO | 2004042517 A2 | 5/2004 |

OTHER PUBLICATIONS

Written Opinion of the International Searching Authority issued Mar. 30, 2023 in connection with PCT Application No. PCT/US23/10229.

International Search Report issued Apr. 18, 2024 in connection with PCT Application No. PCT/US23/81333.

Written Opinion of the International Searching Authority issued Apr. 18, 2024 in connection with PCT Application No. PCT/US23/81333.

International Search Report issued Mar. 3, 2025 in connection with PCT Application No. PCT/US24/61117.

Written Opinion of the International Searching Authority issued Mar. 3, 2025 in connection with PCT Application No. PCT/US24/61117.

International Search Report issued Mar. 7, 2025 in connection with PCT Application No. PCT/US24/56303.

(56) References Cited

OTHER PUBLICATIONS

Written Opinion of the International Searching Authority issued Mar. 7, 2025 in connection with PCT Application No. PCT/US24/56303.
U.S. Appl. No. 19/087,160, filed Mar. 21, 2025 entitled Golf Cart Tow Link.
U.S. Appl. No. 18/987,874, filed Dec. 19, 2024 entitled Pan and Tilt Head.
U.S. Appl. No. 18/963,118, filed Nov. 27, 2024 entitled Golf Play Outcome Simulation Modeling System.
U.S. Appl. No. 18/785,659, filed Jul. 26, 2024 entitled Platform to Manipulate Golf Data to Enable Creation of Broadcast Production Graphics.
U.S. Appl. No. 18/949,970, filed Nov. 15, 2024 entitled Golf Tracking System for Monitoring and Management of Data.
U.S. Appl. No. 18/949,736, filed Nov. 15, 2024 entitled General Purpose Command System and Interface.
U.S. Appl. No. 18/510,522, filed Nov. 15, 2023, entitled Hybrid Power Systems and Methods.
U.S. Appl. No. 19/044,610, filed Feb. 3, 2025, entitled Event Data Immersion System.
U.S. Appl. No. 19/170,473, filed Apr. 4, 2025, entitled Management of Golf Tournament Scoring Data.
U.S. Appl. No. 18/999,995, filed Dec. 23, 2024, Golf Tournament Management System.
Written Opinion of the International Searching Authority issued Jun. 5, 2025 in connection with PCT Application No. PCT/US25/23267.
International Search Report issued Jun. 5, 2025 in connection with PCT Application No. PCT/US25/23267.
Written Opinion of the International Searching Authority issued Jul. 15, 2025 in connection with PCT Application No. PCT/US25/14383.
International Search Report issued Jul. 15, 2025 in connection with PCT Application No. PCT/US25/14383.

\* cited by examiner

GOLF EVENT BROADCAST PRODUCTION SYSTEM

BACKGROUND

Professional golf tournaments are regularly broadcast on television and other mediums for fan viewing. These broadcasts often include video and audio commentary focusing on multiple golfers and groups of golfers that are in contention during the tournament or that are otherwise of interest to the viewing audiences. The broadcasts also include video and audio commentary covering other golfers and groups in the field, including highlights, interviews, and pre-recorded video features of stories relevant to golfers and the event.

Golf tournaments typical include four tournament rounds that start with up to 144 players competing in up to 48 groups of 3 players. Over the course of those 4 rounds, the groups of golfers simultaneously compete on 18 different holes in each round and take approximately 32,000 golf shots, making it impossible for broadcasts to cover every golf shot from every player. Golfers and golf fans come from diverse backgrounds and hail from all over the world. Thus, it is not surprising that golfers and groups of golfers that may be of interest to one fan may be of little to no interest to another. That is, despite the attempts of broadcasts to cover golfers and golf play of interest to significant portions of the viewing audience, many fans have a desire to watch complete coverage of a golfer or group of golfers during tournament play, without missing a golf shot.

What is needed is improved golf tournament coverage platforms that may be customized to the desires of the diverse viewing audience that includes coverage aspects that appeal to viewers.

SUMMARY

In one aspect, a golf event production system may include a media data collection network, a tracking system, and a production platform. The media data collection network may include cameras positioned around a golf course to collect media data of a golf event. In one example, the media data collection network further includes one or more microphones positioned around the course to collect media data. The tracking system includes a sensor network that collects golf tracking data during the event. The production platform includes a production processor that receives feeds of the media data and performs switching operations between camera source feeds from the various course positions according to a production algorithm to produce live programs of players or player groups competing in the golf event and streams the programs to program recipients for live broadcast viewing.

In one example, grouped production elements may be dynamically recalled during play and integrated into the operations of the production processor for live broadcast program production. In one configuration, the production processor enables a single production operator to produce a live broadcast program for a player group that covers every shot by every player in the group for a full round.

In an above or another example, the production processor produces a program for each group competing in the golf event, including every shot of each player throughout a full round.

Program recipients may include a distribution platform that distributes the programs to additional program recipients. In one example, one or both of the production processor or distribution platform operates in a cloud computing environment.

In any of the above or another example, the distribution platform includes or is configured to distribute the programs to a system for consumption of live event broadcasts that enables simultaneous display of the programs and a graphical version depicting the golf event, in sync, in a user interactive display format.

In another aspect, a production platform is configured to produce live programs of players or player groups competing in a golf event including one or more rounds of a golf tournament. The production platform may include a production processor that receives feeds of the media data captured by a media data collection network comprising a plurality of cameras positioned around a golf course. The production processor performs switching operations between camera sources according to a production algorithm utilizing golf tracking data collected by a tracking system comprising a sensor network positioned around a golf course of the golf event to produce live programs of players or player groups competing in the golf event. Each camera source corresponds to a course position and includes the media data captured by a camera associated with the course position. In one example, the media data collection network may include microphones positioned around the course and one or more microphones may also be associated with the course position and included in the camera source feed. The produced live programs may be streamed to program recipients for consumption and live broadcast viewing.

In one example, the production processor produces a program for each competing group of players.

In the above or another example, the production platform may operate in a cloud computing environments.

In any of the above or another example, grouped production elements may be dynamically recalled during play and integrated into the operations of the production processor for live broadcast program production. In one configuration, the production processor enables a single production operator to produce a live broadcast program for a player group that covers every shot by every player in the group for a full round.

In any of the above or another example, program recipients include a distribution platform. The production processor may stream programs directly to the distribution platform. For example, programs may be streamed directly to the distribution platform over an open internet connection. In one example, the production processor and distribution platform operate in a cloud computing environment.

The production processor may receive production elements that it uses to produce the programs. The production elements may include graphics, such as live graphics, pre-produced video, camera source grouping, or combination thereof. In one example, production elements include the production algorithm.

In one example, the production processor includes a production elements switcher interface configured to interface a production operator with switching operations of the production processor.

In one example, the production processor is configured to incorporate the production elements into the production elements switcher interface such that switching operations directed by the production elements switcher interface are linked to the production elements specified by the production algorithm.

In any of the above or another example, the production processor is configured to dynamically update live graphics with the golf tracking data and incorporate the live graphics into programs according to the production algorithm.

In the above or another example, the production processor receives dynamically updated graphics or updated portions thereof from a graphics engine and incorporates the live graphics into programs according to the production algorithm. In one example, the dynamically updated live graphics or portions thereof are received in HTML.

In one example, the production elements are grouped by holes, and the production processor incorporates the production elements for each hole into switching operations of a production elements switcher interface when recalled by the production processor or a production operator.

In any of the above or another example, the production processor is configured for autonomous switching driven by event activities of the golf event. In one example, the production processor is configured to identify camera sources and perform autonomous switching according to the production algorithm to assemble programs of each shot of a player or group of players throughout a round. In one example, the tracking system tracks event activities and generates a signal upon the occurrence of an event activity. In a further example, the production processor listens for signals corresponding to event activities that trigger switching operations specified by the production algorithm. In an above or another example, occurrences of event activities are transmitted to the production processor. In an above or another example, the production processor monitors the golf tracking data to identify event activities that trigger switching operations specified by the production algorithm.

In one example, the tracking system, production processor, or combination thereof is configured to employ player recognition, playing order, location of a player relative to a ball at a resting position of a previous shot by the player, location of a player relative to a ball when detected to be swinging, or combination thereof to associate players to balls. Radar devices of the sensor network may be used to detect player swing events. In one example, the production processor uses time and hole location of an occurrence of an event activity to identify a camera source capturing the event activity and trigger switching between camera source feeds. In one example, the tracking system, production processor, or combination thereof is preloaded with field of views of each camera of the media data collection network and is configured to utilize player location, ball location data, or other event activity location to identify camera sources capturing event activities based on the field of view and tracked location data. In one example, the tracking system, production processor, or combination thereof employs computer vision to identify players, balls, or both in video data captured on the course to drive autonomous switching operations.

In any of the above or another example, the production platform includes a commentary generator configured for autonomous generation of program commentary. The commentary generator may utilizes golf tracking data, video, and a large language model. In one example, the commentary generator further utilizes assets selected from competition related data, theme related data, or combination thereof. The commentary generator may be configured to generate program commentary in different points of view. The points of view may include color analysis, play analysis, or statistical analysis. The commentary generator may be configured to generate program commentary in multiple languages.

In any of the above or another example, the media data captured by the media data collection network is streamed to an encoder configured to encode the media data and stream the encoded media data to the production processor. In one example, each camera position on the course includes a camera and one or more microphones. The media data from each camera position may be input into the encoder in a different channel to provide a camera source for each camera position. The encoded media data may be streamed to the production processor. In one example, the encoded media data may also be streamed to a media quality analysis module. The media data captured by the media data collection network may also be streamed to a media quality control module. The media quality control analysis module may monitor the media data. The media quality analysis module may compare the encoded media data feed streamed to the production processor with the unencoded media data stream from the same camera source. Multi-viewers may display unencoded media data from the course and the encoded media data streamed to the production platform. The media data may be monitored for degradation in media quality or other discrepancies in the media data feed streamed to the production processor. An alarm or other signal may be generated if audio dropout or a discrepancy in video occurs. The media quality analysis module may receive program streams from the production processor and monitor media quality of the programs utilizing multi-viewers. In any of the above or another example, the media quality analysis module is configured to perform autonomous quality analysis between unencoded and encoded media data feeds utilizing video or audio comparison techniques. In one example, the media quality analysis module utilizes video comparison techniques including content matching using image identification and processing to compare video or image frames thereof for matched or mirrored content.

In any of the above or another example, the media data collection network includes drones or smart phone cameras that provide additional video data for a hole.

In any of the above or another example, camera sources further include live media data captured by spectators and streamed to the production platform for use by the production processor to produce programs.

In any of the above or another example, the sensor network includes sensors comprising one or more radar devices, cameras, or laser devices. Sensors may include launch monitors, which may include a radar device in every tee box to measure launch data of balls hit by players from the tee box.

In any of the above or another example, the tracking system is configured for autonomous collection of golf tracking data. In one example, computer vision is utilized to identify and track players. The tracking system is configured to utilize radar devices to detect balls in flight, swings, or both.

In any of the above or another example, the distribution platform includes or is configured to distribute the programs to a system for consumption of live event broadcasts configured to enable display of media content comprising the programs of the golf tournament produced by the production processor and graphical version depicting the golf tournament simultaneously, in sync, in a user interactive display format.

In yet another aspect, a method of producing live programs of golf events includes receiving media data of a golf event captured by a media data collection network comprising a plurality of cameras and microphones positioned around a golf course the golf event is played, the golf event comprising one or more rounds of a golf tournament. The method further includes receiving golf tracking data of the golf event collected by a tracking system comprising a sensor network configured to collect the golf tracking data during play of the golf event. The method further includes receiving feeds of the media data at a production processor, and performing with the production processor switching operations between camera sources according to a production algorithm to produce live programs of players or player groups competing in the golf tournament. Each camera source may correspond to a course position and includes the media data captured by a camera and, optionally, one or more microphones associated with the course position. The production processor is configured to stream the programs to program recipients for live broadcast viewing.

In one example, the production processor produces a program for each competing group of players.

In the above or another example, the production platform may operate in a cloud computing environments.

In any of the above or another example, grouped production elements may be dynamically recalled during play and integrated into the operations of the production processor for live broadcast program production. In one configuration, the production processor enables a single production operator to produce a live broadcast program for a player group that covers every shot by every player in the group for a full round.

In any of the above or another example, program recipients include a distribution platform. The method may include streaming programs directly to the distribution platform. For example, programs may be streamed directly to the distribution platform over an open internet connection. In one example, the production processor and distribution platform operate in a cloud computing environment.

The production processor may receive production elements that it uses to produce the programs. The production elements may include graphics, such as live graphics, pre-produced video, camera source grouping, or combination thereof. In one example, production elements include the production algorithm.

In one example, the production processor includes a production elements switcher interface configured to interface a production operator with switching operations of the production processor. In one example, the method may further include incorporating the production elements into the production elements switcher interface such that switching operations directed by the production elements switcher interface are linked to the production elements specified by the production algorithm.

In any of the above or another example, the method may further include using the production processor to dynamically update the live graphics with the golf tracking data and incorporating the live graphics into the program according to the production algorithm. In the above or another example, the method may further include receiving with the production processor dynamically updated live graphics from a graphics engine and incorporating the live graphics into the program according to the production algorithm. In one example, the dynamically updated live graphics or portions thereof are received in HTML.

In one example, the production elements are grouped by holes, and the production processor incorporates the production elements for each hole into switching operations of a production elements switcher interface when recalled by the production processor or a production operator.

In any of the above or another example, the method may further include identifying camera sources and performing with the production processor autonomous switching according to the production algorithm to assemble programs of each shot of a player or group of players throughout a round. In one example, the production processor is configured to identify camera sources and perform autonomous switching according to the production algorithm to assemble programs of each shot of a player or group of players throughout a round. In one example, the tracking system tracks event activities and generates a signal upon the occurrence of an event activity. In a further example, the production processor listens for signals corresponding to event activities that trigger switching operations specified by the production algorithm. In an above or another example, occurrences of event activities are transmitted to the production processor. In an above or another example, the method may further include monitoring with the production processor the golf tracking data collected by the tracking system for event activities that trigger switching operations specified by the production algorithm.

In one example, the tracking system, production processor, or combination thereof is configured to employ player recognition, playing order, location of a player relative to a ball at a resting position of a previous shot by the player, location of a player relative to a ball when detected to be swinging, or combination thereof to associate players to balls. Radar devices of the sensor network may be used to detect player swing events. In one example, the production processor uses time and hole location of an occurrence of an event activity to identify a camera source capturing the event activity and trigger switching between camera source feeds. In one example, the tracking system, production processor, or combination thereof is preloaded with field of views of each camera of the media data collection network and is configured to utilize player location, ball location data, or other event activity location to identify camera sources capturing event activities based on the field of view and tracked location data. In one example, the tracking system, production processor, or combination thereof employs computer vision to identify players, balls, or both in video data captured on the course to drive autonomous switching operations. In any of the above or another example, the method may further include automatically generating program commentary with a commentary generator. The commentary generator may utilizes golf tracking data, video, and a large language model. In one example, the commentary generator further utilizes assets selected from competition related data, theme related data, or combination thereof. The commentary generator may be configured to generate program commentary in different points of view. The points of view may include color analysis, play analysis, or statistical analysis. The commentary generator may be configured to generate program commentary in multiple languages.

In any of the above or another example, the media data captured by the media data collection network is streamed to an encoder configured to encode the media data and stream the encoded media data to the production processor. In one example, each camera position on the course includes a camera and one or more microphones. The media data from each camera position may be input into the encoder in a different channel to provide a camera source for each camera position. The encoded media data may be streamed to the production processor. In one example, the encoded media data may also be streamed to a media quality analysis module. The media data captured by the media data collection network may also be streamed to a media quality control module. The media quality control analysis module may monitor the media data. The media quality analysis module may compare the encoded media data feed streamed to the production processor with the unencoded media data stream from the same camera source. Multi-viewers may display unencoded media data from the course and the encoded media data streamed to the production platform. The media data may be monitored for degradation in media quality or other discrepancies in the media data feed streamed to the production processor. An alarm or other signal may be generated if audio dropout or a discrepancy in video occurs. The media quality analysis module may receive program streams from the production processor and monitor media quality of the programs utilizing multi-viewers. In any of the above or another example, method may further include performing with the media quality analysis module autonomous quality analysis between unencoded and encoded media data streams utilizing video or audio comparison techniques. In one example, the media quality analysis module utilizes video comparison techniques including content matching using image identification and processing to compare video or image frames thereof for matched or mirrored content.

In any of the above or another example, the media data collection network includes drones or smart phone cameras that provide additional video data for a hole.

In any of the above or another example, camera sources further include live media data captured by spectators and streamed to the production platform for use by the production processor to produce programs.

In any of the above or another example, the sensor network includes sensors comprising one or more radar devices, cameras, or laser devices. Sensors may include launch monitors, which may include a radar device in every tee box to measure launch data of balls hit by players from the tee box.

In any of the above or another example, the tracking system is configured for autonomous collection of golf tracking data. In one example, computer vision is utilized to identify and track players. The tracking system is configured to utilize radar devices to detect balls in flight, swings, or both.

In any of the above or another example, the distribution platform includes or is configured to distribute the programs to a system for consumption of live event broadcasts configured to enable display of media content comprising the programs of the golf tournament produced by the production processor and graphical version depicting the golf tournament simultaneously, in sync, in a user interactive display format.

In still another aspect, a system for consumption of live event broadcasts includes a distribution platform and a platform interface. The distribution platform enables display of media content comprising a live video version and graphical version of a live golf event simultaneously, in sync. The platform interface accessible by a user device and configured for user interaction, wherein the platform interface presents a options for selection of the media content for streaming to the user device.

In one example, the distribution platform includes a webserver and web application accessible via an internet connection. In one example the web application includes a video streaming application.

In the above or another example, the platform interface is configured to provide display options. The display options may include event navigation options. Example event navigation options may be location specific, view specific, player specific, perspective specific, event information specific, or combination thereof. In one example, event navigation options are configured to enable users to dynamically manipulate graphical versions to navigate around the course, zoom into or out of views, or change perspectives. In the above or another example, event navigation options include a green view, wherein users may change view magnification to zoom into a graphical depiction of a green. The green view may include green undulations, green slopes, or both. The green view may be configured to enables users view green undulations and slopes relative to a ball location of a player putting in a displayed live video version prior to or after the player attempts the putt. In one example the platform interface is configured to enable users to interact with the green view and request a prediction of a successful putting line relative to a ball location of a player putting in a displayed live video version.

In any of the above or another example, the platform interface includes audio options selectable by users to customize audio presentation with respect to live video versions, graphical versions, or both. In one example, audio options include sound track or commentary related options. In one example, audio options include incorporation of commentary in one of a plurality of selectable languages. In this or another example, commentary options include incorporation of commentary from different points of view. Example points of view may include color analysis, play analysis, or statistical analysis.

In any of the above or another example, the platform interface may include user selectable display layout options to enable users to display selected live video versions and graphical versions in a customized display layout. Example selectable display layout options may include options to specify display panel size, location, or both for one or more selected live video versions, graphical versions, or both. In one example, selectable display layout options may enable a user to select four live video versions to view in a single display. In the above or another example, selectable display layout options may include dynamic display options wherein a user may specify versions to be dynamically displayed in particular display panels based on a timed sequence, golf event activities, or both.

In any of the above or another example, the selectable live video and graphical versions for display correspond to a player, multiple players, a player group, or player groups.

In any of the above or another example, the platform interface is configured to provide display options for viewing a selected live video version and a selected graphical version in a split screen display.

In any of the above or another example, the platform interface provides display options that enable a user to view selected live video versions without graphics or toggle graphics on and off.

In any of the above or another example, the platform interface is configured to enable a user to view selected graphical versions of the event depicted from different perspectives, locations, or both. In one example, the platform interface is configured to enable a user to view selected graphical versions of the event depicted from different perspectives, wherein the perspectives include one or more of fan perspective, player perspective, overhead, green view, tee box view, fairway view, or landing zone view. In this or another example, the platform interface is configured to enable users to change the perspectives on the fly.

Graphical versions may include graphical depictions of the golf event. Graphical versions may include computer generated content. The computer generated content may include computer generated animation depicting the golf event. In one example, the computer generated content is provided in 3D, augmented reality, or virtual reality display. In this or another example, graphical versions may be generated using computer animation, graphic engines, game engines, or other digital animation technologies. In one example, graphical versions are generated using a video to animation process.

In any of the above or another example, graphical versions incorporate dynamic shot trails, radar data, green view, highlights, different viewing perspectives, player or player group specific statistical data, event statistics, or combination thereof. In one example, graphical versions include computer generated animations of shots that accurately reflect ball flight within a graphical depiction of the shot on the course. In this or another example, graphical versions incorporate visualizations of shot shapes and shot traces. In any of the above or another example, graphical version integrates statistics related to the event. In any of the above or another example, graphical versions include graphical versions incorporating identification of equipment or clothing products used or worn by players. In any of the above or another example, graphical versions include graphical versions incorporating probabilities of occurrence of outcomes related to shots or the competition. In any of the above or another example, graphical versions include graphical versions incorporating dynamic betting odds related to the golf event.

In any of the above or another example, the platform interface is configured to enable users to interact with live video version displays to select shots, and wherein the distribution platform is configured to acquire or generate a highlight video of the selected shots for subsequent viewing by the user.

In one example, the user device includes a computer, tablet, smart phone, smart television, projector, interactive television device, an augmented reality or virtual reality headset, projector, or other augmented or virtual reality device, or combination interface.

In yet still another aspect, a method includes providing a platform interface to a platform for consumption of live event broadcasts. The platform interface may including a plurality of live video versions of a golf event and one or more graphical versions of the golf event selectable for viewing by user devices accessing operations of the platform via the platform interface. The method may include receiving from a user device a media content selection comprising one or more of the live video versions and one or more of the graphical versions. The method may further include causing the selected live video and graphical versions to be streamed to the user device for simultaneous display, in sync, within an interactive display presented on the user device.

In one example, the distribution platform includes a webserver and web application accessible via an internet connection. In one example the web application includes a video streaming application.

In the above or another example, the method may further include providing display options selectable via the platform interface to allow a user of the user device to customize the display of the media content. The display options may include event navigation options. Example event navigation options may be location specific, view specific, player specific, perspective specific, event information specific, or combination thereof. In one example, event navigation options are configured to enable users to dynamically manipulate graphical versions to navigate around the course, zoom into or out of views, or change perspectives. In the above or another example, event navigation options include a green view, wherein users may change view magnification to zoom into a graphical depiction of a green. The green view may include green undulations, green slopes, or both.

The green view may be configured to enables users view green undulations and slopes relative to a ball location of a player putting in a displayed live video version prior to or after the player attempts the putt. In an above or another example, the method may further include receiving a request for a request for a prediction of a successful putting line relative to a ball location of a player putting in a displayed live video version and causing display of the predicted putting line in the green view.

In any of the above or another example, the method may further include providing audio options selectable via the platform interface to enable a user of the user device to customize audio associated with the display of the media content with respect to live video versions, graphical versions, or both. In one example, audio options include incorporation of commentary in one of a plurality of selectable languages. In this or another example, commentary options include incorporation of commentary from different points of view. Example points of view may include color analysis, play analysis, or statistical analysis.

In any of the above or another example, the method may further include providing display layout options selectable via interaction with the platform interface to enable a user of the user device to display selected live video versions and graphical versions in a customized display layout. Example selectable display layout options may include options to specify display panel size, location, or both for one or more selected live video versions, graphical versions, or both. In one example, selectable display layout options may enable a user to select four live video versions to view in a single display. In the above or another example, selectable display layout options may include dynamic display options wherein a user may specify versions to be dynamically displayed in particular display panels based on a timed sequence, golf event activities, or both.

In any of the above or another example, the selectable live video and graphical versions for display correspond to a player, multiple players, a player group, or player groups.

In any of the above or another example, the platform interface is configured to provide display options for viewing a selected live video version and a selected graphical version in a split screen display.

In any of the above or another example, the method may further include providing via the platform interface display options that enable a user of the user device to view selected live video versions without graphics or toggle graphics on and off.

In any of the above or another example, the method may further include providing via the platform interface display options to view selected graphical versions of the event depicted from different perspectives, locations, or both. In one example, the method may further include providing via the platform interface an option to view selected graphical versions of the event depicted from different perspectives, and wherein the perspectives include one or more of fan perspective, player perspective, overhead, green view, tee box view, fairway view, or landing zone view. In this or another example, the method may further include causing a current perspective view of a displayed graphical version to immediately change when a user selects the change via interaction with the platform interface.

Graphical versions may include graphical depictions of the golf event. Graphical versions may include computer generated content. The computer generated content may include computer generated animation depicting the golf event. In one example, the computer generated content is provided in 3D, augmented reality, or virtual reality display.

In this or another example, graphical versions may be generated using computer animation, graphic engines, game engines, or other digital animation technologies. In one example, graphical versions are generated using a video to animation process.

In any of the above or another example, graphical versions incorporate dynamic shot trails, radar data, green view, highlights, different viewing perspectives, player or player group specific statistical data, event statistics, or combination thereof. In one example, graphical versions include computer generated animations of shots that accurately reflect ball flight within a graphical depiction of the shot on the course. In this or another example, graphical versions incorporate visualizations of shot shapes and shot traces. In any of the above or another example, graphical version integrates statistics related to the event. In any of the above or another example, graphical versions include graphical versions incorporating identification of equipment or clothing products used or worn by players. In any of the above or another example, graphical versions include graphical versions incorporating probabilities of occurrence of outcomes related to shots or the competition. In any of the above or another example, graphical versions include graphical versions incorporating dynamic betting odds related to the golf event.

BRIEF DESCRIPTION OF THE DRAWINGS

The novel features of the described embodiments are set forth with particularity in the appended claims. The described embodiments, however, both as to organization and manner of operation, may be best understood by reference to the following description, taken in conjunction with the accompanying drawings in which:

DESCRIPTION

Modern golf tournaments may have up to 144 players, often divided into groups of three players to start the tournament. To broadcast every shot live for each player or otherwise, a golf event production system may utilize a media data collection network comprising cameras positioned on every hole covering each location from tee to green, for an entire event. In one configuration, each camera may be responsible for covering a single position on the course. As the players make their way around the course, cameras are in position to capture each player taking their shots at every location. The media data collection network may similarly include microphones positioned around the course to cover audio with respect to each location from tee to green. The golf data may be processed by the system to produce programs for viewing, e.g., for distribution and viewing.

The golf event production system may provide a blue print for capturing golf data including every golf shot from every player at a golf tournament, processing the golf data with a production platform into various programs, and distributing the programs to program recipients such as a distribution platform for further distribution to program recipients. The programs may include discrete programs of a particular player, player group of players, highlights, play-by-play, compilation, or the like of tournament play. The programs may be available for live broadcasts or on demand. The programs may be live streamed to parties such as clients and production partners. The programs may be distributed from a media distribution platform for access and further distribution by parties such as media content providers or directly to consumers via internet connection. The programs may be available or distributed to parties for editing, e.g., to generate highlights or other customized programs, further production to generate enriched content, integration of additional content, which may include additional golf data, graphics, or otherwise.

FIGS. 1-13 illustrate various embodiments of a golf event production systems, systems for consumption of live event broadcasts, and components thereof, wherein like numbers indicate like features.

Figure 1:
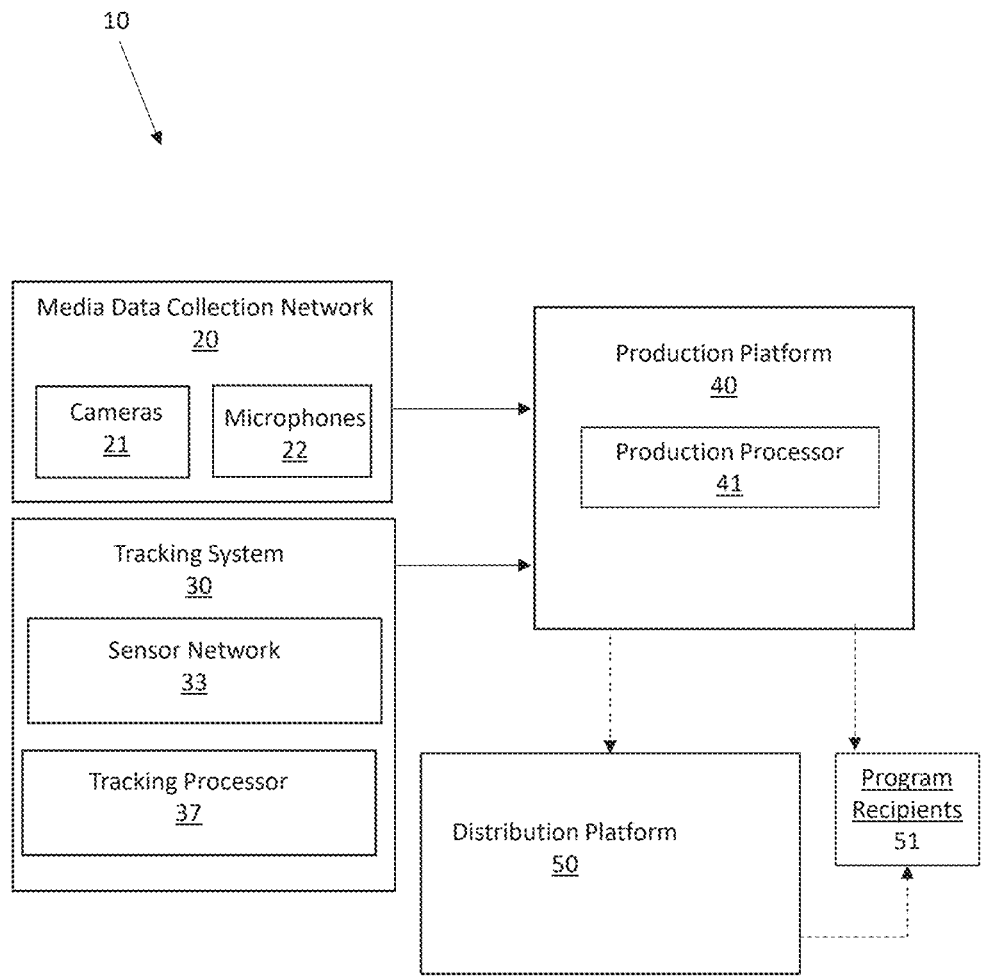
FIG. 1 is a schematic of a golf event production system according to various embodiments described herein.

With reference to FIG. 1, a golf event production system 10 may be configured to capture golf data during a golf tournament for production processing and distribution. In one example, the golf event production system 10 is configured to one or more of capture, process, or distribute golf data including video, audio, and scoring statistics of every shot of every player during a golf tournament. The golf data may be processed for distribution in discrete programs corresponding to a particular player or player group. Programs may be further produced to generate highlights, play-by-play, or player compilations from the programs for further distribution.

The golf event production system 10 may include or incorporate media data collected by a media data collection network 20 and golf tracking data collected or generated by a tracking system 30. The golf event production system may also include a production platform 40 including a production processor 41 configured to process the media data collected by the media data collection network 30 and golf tracking data collected by the tracking system 30 to produce a plurality of programs of golfers or groups of golfers. In one example, one or more programs are produced for each group of competing golfers in a tournament to cover every shot of every player in the group. The golf event production system 10 may also include or be configured to output programs produced by the production platform 40 directly to program recipients 51 or from program recipient 51 comprising a distribution platform 50 for distribution of programs. Distribution may include streaming the produced programs to partners, for example directly to partners via an internet stream, which may include streaming to hardware decoders, other platforms, processors, storage databases, or combination thereof.

The media data collection network 20 includes media data collection devices such as cameras 21 to capture video data of the golf tournament. Cameras 21 may be positioned to capture video data of players, balls, course, venue, or other scenes taking place at the event. In some embodiments, the media data collection devices may also include microphones 22 to capture audio data from the golf tournament. Microphones 22 may be positioned to capture audio data on and around the golf course, such as natural sounds of play, e.g., ambient sound. Microphones 22 may be positioned to capture sounds that correspond to scenes captured by cameras 21 to accurately depict the sights and sounds of tournament play. For example, multiple cameras 21 and microphones 22 may be positions on each hole of a golf course hosting the golf tournament. As described in more detail below, a feed from each camera 21 and one or more microphones 22 may comprise a media data source associated with a position on a particular hole that the golf event production system 10 uses to produce programs.

Figure 2:
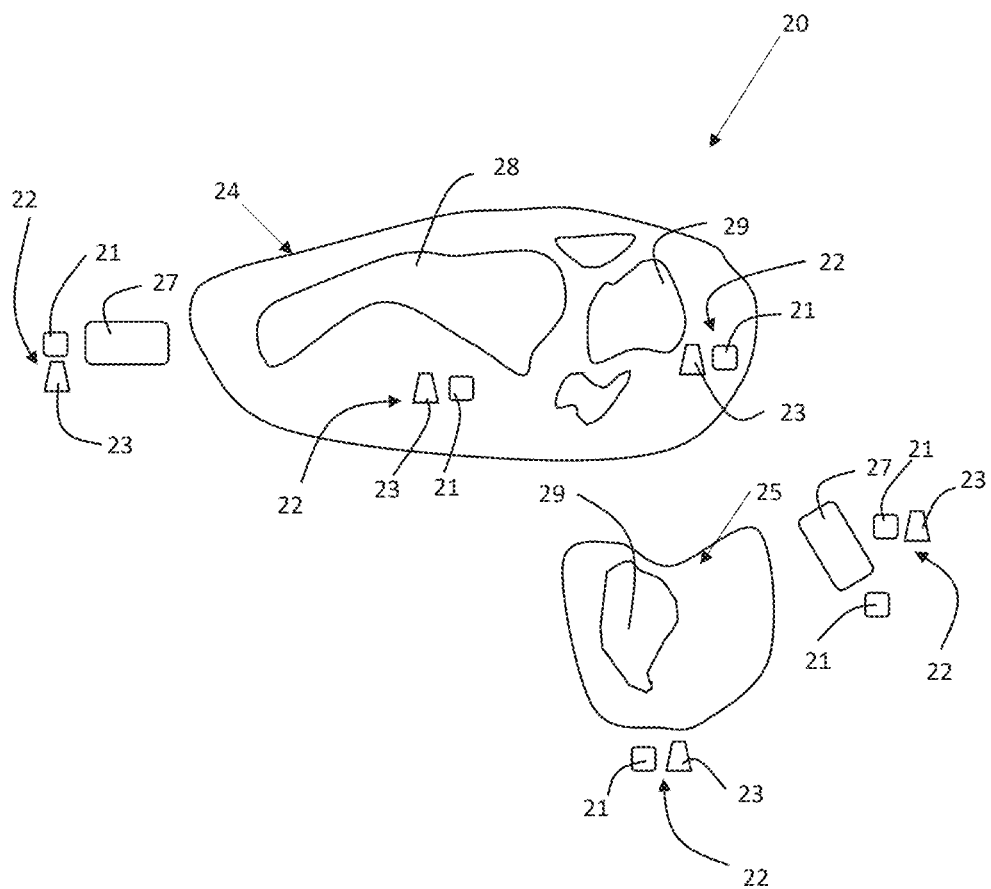
FIG. 2 depicts an overhead view of hole setups for a par-4 hole and a par-3 hole of a media data collection network according to various embodiments described herein.

With further reference to FIG. 2, the captured media data may include video data captured by cameras 21 from one or more camera positions 22 of the holes on the golf course. For example, video data may be captured from cameras 21 positioned at every hole. One or more cameras 21 may be positioned around tee boxes 27 to capture video data of the tee box 27 and activity therein. For instance, cameras 21 may capture video data of players in or around tee boxes 27, such as approaching the tee box, preparing to tee off, teeing off, or after teeing off. Such cameras 21 may capture video data of shots from the tee box 27. One or more cameras 21 may be positioned near greens 29 to capture video data of greens 29 and activity on or around the green 29. For instance, the cameras 21 may capture video data of players on or around the green 29 preparing to putt, putting, or following putts. Such cameras 21 may capture shots or putts on and around the green 29, approaching or landing on the green 29, rollouts, ball locations, and the like. One or more cameras 21 may be positioned along fairways 28 to capture activity on or around the fairway 28. For instance, the cameras 21 may capture video of players in or around the fairway 28 preparing to hit, hitting, or after hitting shots. Scenes captured by cameras 21 may include landing zones of first shots, subsequent shots, approach shots, or the like. Such cameras 21 may capture golf shots, ball in flight, ball impacts, subsequent ball travel, and ball at rest. Cameras 21 may be positioned near or otherwise positioned to capture video of preferred or alternative landing zones, layup landing zones, or other locations a ball may be hit. Any of the above or other cameras 21 may capture video data of the course and surrounding area.

Cameras 21 may be positioned to provide any desired angle or perspective. For example, one or more cameras 21 may be positioned to provide a point of view perspective looking from or near the tee box 27 or fairway 28 toward the green 29 to capture players, swings, and shots. Additionally or alternatively, one or more cameras 21 may be positioned to provide a flanking view of the tee box 27 or fairway 28, e.g., to provide a side view of players, swings, and shots. In one configuration, cameras 21 may be positioned to provide point of view shots of the tee box 27 or fairway 28 from the hole or the direction players hit the ball or offset therefrom. Point of view positions may include capturing the players in the scene or providing a player point of view perspective. Cameras 21 may be positioned to provide views directed at downward angles, level, or upward angles. Such cameras 21 may be positioned below eye level, at or near eye level, or above eye level. For instance, cameras 21 may be positioned at elevated positions to provide overhead views.

In one embodiment, each hole includes one or more cameras 21 positioned to capture video of tee box activity and one or more cameras 21 to capture activity on and around the green 29. Par-4 holes 24 and par-5 holes may include one or more cameras 21 positioned to capture video of fairway activity. In this or another embodiment, par-3 holes 25 may include a tee box camera 21 positioned to provide point of view perspective. These cameras 21 or other cameras 21 may optionally be positioned or movable to provide a flanking view. One or more cameras 21 may be positioned around the green 29, e.g., at an elevated position, such as on scaffolding, to capture green activity. Par-4 holes 24 and par-5 holes may include one or more cameras 21 positioned to collect tee box activity and one or more cameras positioned to collect green activity as described with respect to the par-3 holes 25. Par-4 holes 24 and par-5 holes may include one or more cameras 21 positioned to capture fairway activity. For instance, a camera 21, which may be a handheld camera, may be positioned to capture fairway activity at or around a first shot landing zone. Par-5 holes may include a camera 21 positioned to capture fairway activity at or around a fairway or a green layup landing zone. As indicated above, cameras 21 may be positioned to capture video of additional locations and activity on and around the course. For instance, cameras 21 may be position to capture scenic views of the venue, e.g., clubhouse, practice area, course, entrances, spectators, on-site fan enhancements or spectator activities.

Cameras 21 may be stationary, mobile, or both. Cameras 21 may be mounted on manned or unmanned vehicles, which may include areal or terrestrial drones. For example, drones may be operated over the course to capture live play. Drones may be fully or partially autonomous. Drones may be remotely controlled by humans, robotics, or autonomous technologies. Such drone footage may be used to provide additional video coverage. Cameras 21 may be fixed with respect to view or may be adjustable to change view, e.g., angle or perspective. The media data collection network 20 may include motorized camera mounts including gearing to move mounted cameras 21 during video capture of the event and change the view collected by the camera 21. Adjustment of cameras 21 view may be manual, remotely controlled, or autonomous, e.g., based on detected movements. For instance, computer vision may be employed using object recognition, detection, or other techniques to provide image tracking to instruct programed movements in response to the tracking. In one example, the camera mounts are controllable remotely. Remote control operators may be present on the course or may control the camera mounts from offsite locations using suitable communication networks, such as internet, WiFi, cellular networks, or the like. Such networks may be wired, wireless, or both. Additionally or alternatively, cameras 21 may be configured to autonomously track players and balls around the course. Using computer vision, cameras 21 may track players and balls. In one example, autonomous tracking employs golf tracking data collected by the tracking system 30 to inform, enhance, or reinforce autonomous camera tracking. For example, when the tracking system 30 collects a shot being taken by a particular player on a hole, the data may be used to inform, enhance, or reinforce identification of a player being tracked by the cameras 21 based on the location and timing of the shot relative to captured video data. Cameras 21 may also be handheld by personnel assigned to a defined hole position or roving.

In some embodiments, the media data collection network 20 or production platform 40 may receive video and/or audio data captured by other media data collection devices, such as cell phones or other cameras. For example, media data captured by spectators using smart phones or other cameras may be incorporated in the production operations of the production platform 40 to produce programs as described herein. In one configuration, spectator video may be analyzed for location, scene identification, or other captured elements for use in programs. Analysis may include applying computer vision to spectator video, such as with respect to player, clothing, gait, or other aspects captured in the video, to identify the scene, which may include location, time, captured players or events, as examples. Additionally or alternatively, geolocation data may be embedded in captured media data that the media data collection platform 20 or production platform 40 may use to identify and associate the media data with a hole, player group, player, event, or combination thereof to properly associate the media data for availability for inclusion in a corresponding program. In one example, spectators may register as video capturers for an event and the captured media data may be streamed for analysis and possible inclusion in programs.

In some embodiments, video data, audio data, or both collected by the media data collection network 20, which may include spectator media data collection, may be supported or supplemented with bonded cell coverage technology on and around the course of play.

As introduced above, the media data collection network 20 may be configured to capture media data including audio data captured from one or more microphones 22 positioned on or around the golf course. Various types of microphones 22 may be utilized, such as omnidirectional, unidirectional, or bidirectional microphones. Microphones 22 may include one or more microphones 22. In one example, a microphone 22 includes a stereo microphone or multiple microphones arranged to record sound for stereophonic or other multidimension output. In some embodiments, one or more microphones 22 may be equipped with dishes or parabolic microphones may be use.

In some embodiments, microphones 22 may be positioned in or around tee boxes 27 to capture natural sound in or around tee boxes 27 during play. Microphones 22 may be positioned on or along fairways 28 to capture natural sound on or around fairways 28 during play. Microphones 22 may be positioned on or around greens 29 to capture natural audio from on or around the green 29 during play. Some configurations may include a microphone 22 positioned in or around tee boxes 27 and a microphone 22 on or around greens 29. Some such configurations may include microphones 21 positioned on or around fairways 28. In one embodiment, microphones 22 are associated with, e.g., positioned with or otherwise near all or select cameras 21 assigned to each hole. For example, each camera position 22 may include a camera 21 and one or more microphones 22. Microphones 22 may be positioned to capture audio data corresponding to the time and environment of video data captured by cameras 21 to accurately depict the sights and sounds of play when paired with the corresponding video data.

Figure 3:
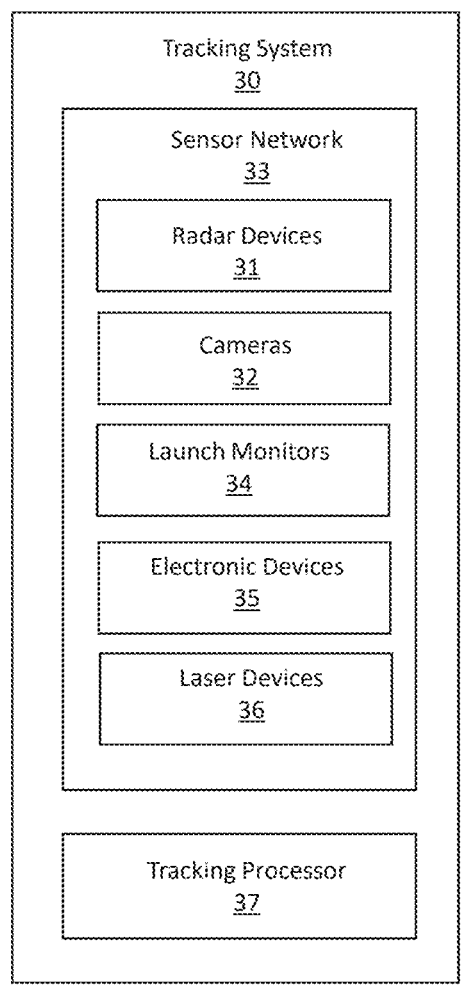
FIG. 3 is a schematic of a tracking system according to various embodiments described herein.
Figure 4:
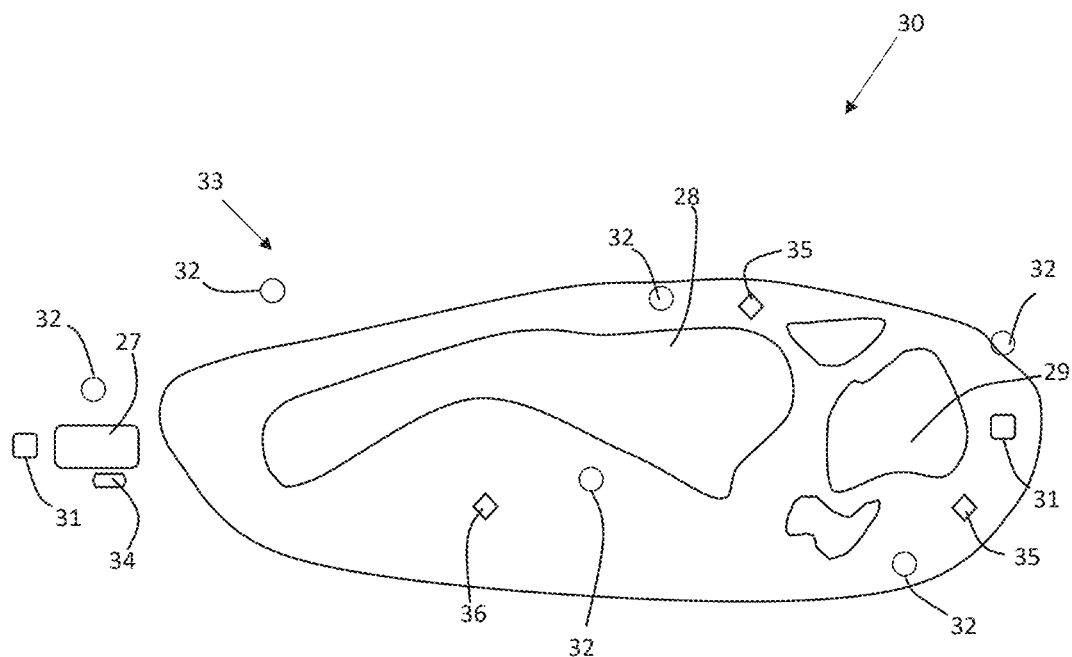
FIG. 4 depicts a hole setup of a tracking system according to various embodiments described herein.

With further reference to FIGS. 3 & 4, the golf event production system 10 may include or incorporate data collected by a tracking system 30. The tracking system 30 may collect golf tracking data such as one or more of scoring data, player and ball location tracking data, or other tracking data, which may include player or ball identification, ball flight tracking, or data derived therefrom. For example, the tracking system 30 may be configured to detect ball flight or calculate ball flights.

The tracking system 30 may comprise a sensor network 33 comprising a network of sensors positioned around the course to collect live golf tracking data. The golf tracking data may be used to track play and inform production processing operations. The sensor network 33 may include one or more of cameras 32, radar devices 31, or laser devices 35, which may include laser range finders or LIDAR, or combination thereof, configured to capture player location, player swing, ball flight, or other ball or player location or movement tracking data. For example, cameras 32 or laser devices 35 may be used to capture ball at rest data, which may include ball location. The tracking system 30 may include a processor 37 comprising one or more processors and instructions that when executed by a processors performs the operations of the tracking system 30, such as operations of the sensors of the sensor network 33.

The tracking system 30 may allow for the collection and management of the golf tracking data and data derived therefrom to support statistical information for golf events. Some embodiments may include or utilize a tracking system as described in U.S. patent application Ser. No. 17/841,660, filed Jun. 15, 2022, titled Golf Event Management System with Scoring and Location Tracking or U.S. Provisional Patent Application No. 63/599,557, filed Nov. 15, 2023, titled Golf Tracking System for Monitoring and Management of Data, both of which are hereby incorporated by reference herein. The tracking system may be similar to SHOTLINK™, including any version thereof, owned and operated by PGA Tour Enterprises, LLC SHOTLINK™ at professional golf tournaments.

As introduced above, the tracking system 30 may include or utilize a sensor network 33 including a plurality of tacking sensors configured to collect location data. Location data may be collected by the sensors prior to play, during play, after play, or combination thereof. Example tracking sensors may include global positioning sensors, e.g., GPS, radar devices 31, laser devices 35, camera 32 implementation utilizing photogrammetry, computer vision, or combinations thereof. Radar devices 31 may include ground-to-air Doppler radar. Cameras 32 may include digital video cameras, infrared cameras, ultraviolet cameras, thermal cameras, high speed cameras, machine vision cameras, or other similar optical capture devices. Laser devices 35 may include laser technologies, such as LIDAR, for measuring geographic features and laser rangefinders for collecting location data with respect to distance measurements from known locations. In one example, LIDAR is used to identify players and balls, track players and balls, or both. In some embodiments, GPS-enabled laser rangefinders or LIDAR may be implemented to measure distance of an object and collect location of that object. Such laser technologies may utilize real time kinematic (RTK), which increases the accuracy of location measurements by using a small ground network, including a GPS base station, to correct position measurements in real time. In some embodiments, electronic communication devices 35 may be used by personnel on the course to collect, record, or manage location data. Electronic communication devices 35 may include a handheld tablet, smart device/phone, personal data assistant, or a dedicated electronic communication device 35, as examples. Electronic communication devices 35 may include interactive maps in which a user may interact, e.g., with a pointer or by touch, to indicate location of objects such as balls and players. This or another electronic communication device 35 may be configured for use in combination with laser rangefinders or LIDAR for object detection, tracking, mapping, or combination thereof. Photogrammetry techniques may be used to analyze photographs or video frames to extract measurements and other information with respect to ball location, player location, or other applications.

In FIG. 4, an example sensor network 33 of a tracking system 30 is illustrated positioned around a hole of a golf course, such as in or around a tee box 27, fairway 28, or green 29. The sensor network 33 may include additional sensors similarly positioned around other holes of the golf course to perform the tracking operations of the tracking system 30.

The sensor network 33 includes radar devices 31 to track location data for golf balls in flight. In some embodiments, the radar devices 31 may be used to collect data indicating the location, velocity, trajectory, acceleration, or other parameters of the ball flight of a golf ball. Radar may be used to identify location of a golf ball at impact with a golf club and impact with ground. Radar may be used to determine ball flight and related location when the golf ball is at a location where the golf ball is no longer visible by cameras 32 or laser devices 35, such as when the golf ball is behind obstacles. In some embodiments, radar devices 31 may be used to track golf balls up to 400 yards or more away from the radar source under various weather conditions, such as rain, fog, sunrise and sunset. In one implementation, the tracking system 30 utilizes radar devices 31 employing ground-to-air Doppler. Radar devices 31 may be located a one or more locations along a golf course or hole. In the illustrated example, radar devices 31 are placed behind each tee and green of a course, and may be angled towards the center of the fairway. In some embodiments, the radar devices 31 may be operated by a human, robot, or be fully autonomous. In some embodiments, radar devices 31 may additionally or alternatively be mobile, which may include being carried by personnel or vehicles such as drones.

The illustrated sensor network 33 includes laser devices 36 comprising laser rangefinders to measure the distance of objects, such as players or golf balls, from the device. In some embodiments, a laser rangefinder may be GPS-enabled to enable the laser rangefinder to record location data for objects detected by the laser rangefinder in addition to distance measurements. The laser rangefinder may utilize RTK to determine the location of an object with high accuracy, e.g., within a centimeter. The laser rangefinder may be associated with other sensors in the tracking system 30 such that the laser rangefinder measures the distance of objects detected by other sensors in the sensor network 33. In some embodiments, laser rangefinders 36 may be operated by a human, robot, or fully autonomous. In one example, targeting of laser rangefinders 36 may be remotely controllable by the tracking system 30. For instance, targeting of a laser rangefinder may be calibrated with a camera feed view and be mounted with positioning hardware that is remotely controllable by the tracking system 30 such that the tracking system 30 may manipulate the laser rangefinder autonomously or at the direction of a user to target a particular location or object.

The illustrated sensor network includes cameras 32. Cameras 32 may typically be located at known locations, but in some instances one or more cameras 32 may be utilized in a mobile environment, e.g., utilizing RTK. In some embodiments, cameras 32 may be used to identify motion and objects in captured video or image frames thereof and a GPS-enabled laser or laser rangefinder associated with a camera 32 may target such objects to determine distance of the object from the camera 32. Combining camera view angle with distance, the location of the object may be determined. In some embodiments, topology of the region may be mapped or determined by LIDAR, photogrammetry, or combination thereof and added to the distance calculations. In some embodiments, such cameras 32 are operated by a human, robot, or fully autonomous. Cameras 32 may operate in the visual spectrum and/or optical spectrum to include one or more of the visual spectrum, ultraviolet spectrum, or infrared spectrum.

In some embodiments, cameras 32 may be configured with machine learning for computer vision employing object recognition. For instance, the tracking system 30 may employ facial recognition, body recognition, gait recognition, clothing recognition, ball/shape recognition, or the like with respect to video data to identify and track participants and/or balls, pair location with player or player ball, or both. In one embodiment, players carry or wear an optical, electromagnetic, or reflective maker identifiable by a camera 32, which may include an associated receiver, that uniquely identifies the player. In another embodiment, the tracking system 30, or cameras 32 thereof, may utilize object recognition/augmented reality (AR) with respect to captured video data to locate players and/or balls. Location of players and/or balls may be used to locate objects in video data and, for example, track player/ball location for identification of additional tracking sensors capturing or that will capture objects for further tracking the object.

In one implementation, tracked object locations may be used to inform the media data collection network 20, production platform 40, or both. Thus, in one example, object tracking by the tracking system 30 may be used by the media data collection network 20, production processor 41, or both to identify camera 21 positions that are capturing or will capture particular objects, such as players, balls, or both. This may be used to instruct or assist manual or autonomous camera switching by the production processor 41. Switching may be implemented by hardware, software, or both. In various embodiments, tracking system cameras 32 may be used as media data collection network cameras 21. For example, one or more tracking system cameras 32 may be located on each hole to collect scoring and location data, as described herein. The video data collected by these cameras 32 may be fed to the production platform 40 to follow players around the course from tee to green on each hole. These cameras 32 may be used in addition to or instead of cameras dedicated to media data collection. Object tracking utilizing other tracking sensors, such a radar devices 31, may similarly be used to track objects to inform the production platform 40.

The tracking system 30 may implement electronic communication devices 35 that personnel carry on or around the golf course that interact with the tracking system 30. In one embodiment, an electronic communication device 35 includes an interactive display that displays digital maps of the course. Users may interact with the map to mark locations of golf balls, players, or both. In one example, one or more users, each carrying an electronic communication device 35, may be located at each hole to collect location data. In some embodiments, the electronic communication device 35 may be used to record the location of objects on the course and a laser, e.g., laser rangefinder, may be integrated with or coupled with the electronic communication device 35 to measure the distance of the object from the laser source for location determination, In this embodiment, users may use the electronic communication device 35 to record the location of the object by either tapping the location on the digital map, using the associated rangefinder 31 to record the distance and/or location of the object, or a combination thereof. In some embodiments, the electronic communication device 35 utilizes RTK to determine and record the location of objects.

In some embodiments, the tracking system 30 may utilize GPS-monitoring devices worn or carried by players, caddies, or course personnel in order to obtain and track location data corresponding to the device. For example, as players walk the course from hole-to-hole, the GPS device may collect and record location data as corresponding to the location of the player or ball when standing over a ball or hitting a shot. The location data recorded from the GPS device or location data transmitted from the GPS device may be associated with a specific player to uniquely identify that player. The location data recorded from the GPS device may also be cross-referenced with location data recorded from other GPS-enabled sensors used by the tracking system.

While the present description generally refers to GPS, those having skill in the art will appreciate that such reference applies equally to other Global Navigation Satellite Systems (GNSS), such as GLONASS, BeiDou, Galileo, or other current or future GNSS. GPS location may be augmented with WAAS (Wide Area Augmentation System), Differential GPS (DGPS), e.g., Global Differential GPS (GDGPS), real time kinematic (RTK), Continuously Operating Reference Stations (CORS), Signals of Opportunity (SOP)-based or augmented navigation, UWB, LTE, cellular, radio, television, Wi-Fi, other satellite signals, or the like.

Tracking sensors may be calibrated to a field of view relative to map data of the course to enable the tracking system 30 to collect position and coordinate data for any object within the field of view of the sensors. For example, the tracking system may utilize map data to generate a course map comprising a 3D map of the course. The course map may be defined within a coordinate system such that locations or points in the course map are associated with coordinates, which may be referred as a coordinate map. Map data may also include tournament round data and location data for various zones and boundaries on the course for the tournament or particular round. Map data may be obtained or collected prior to play. For example, LIDAR and photogrammetry may be utilized to collect point cloud data of the course. The LIDAR and photogrammetry may be carried by a remotely piloted or autonomously piloted drone or aircraft. A flight path may be charted around the course in order to capture cloud point data. Ground control point may be determined by placing markers at known locations on the course and used by the tracking system 30 as reference points for generating the point cloud data of the course. In one example, this data may be separately mapped before a tournament. To generate the course map, ground control markers may be placed on the course at known locations and recorded. The tracking system 30 may then use the location data for the ground control markers as reference points for generating the course map from the point cloud data. Coordinates of the ground control markers may be used to key the point cloud data to a coordinate system. The tracking system 30 may include point cloud processing hardware and software, which receives map data for the course, extracts the point cloud data and the ground control marker location data, and processes the point cloud data and the ground control marker location data to generate the course model.

In some embodiments, map data includes a zone map comprising detailed identification of zones of the golf course. Location data for various zones and boundaries on the course may be used to generate the zone map. Zones may correspond to parts of a golf course, such as tee box, fairway, green, hazard (bunker or water), rough, drop zone, and the like. The course map may include the zone map or the zone map may be configured to correspond with the course map such that coordinates defined within the course map correspond to or are translatable to the zone map. For example, a coordinate in the course map may correspond, directly or via translation, to a coordinate in the zone map such that cross-referencing the course map coordinate with the zone map identifies the zone that encompasses the coordinate. In one example, the course map includes the zone map and is generated by overlaying or associating the zone specifications from the zone map with the surface identification from the course map to identify zones within the course map.

In some embodiments, the tracking system 30 includes or incorporates golf tracking data collected from launch monitors 34 including launch sensors. Launch sensors may include cameras, lasers, radar, or combination thereof positioned to measure initial shot parameters to output shot metrics. In some embodiments, launch sensors may overlap with or include one or more tracking sensors, such as radar devices 31, cameras 32, or laser devices 36. Using launch sensors, launch monitors 34 may output one or more shot metrics such as launch angle, ball trajectory, spin, swing speed, ball speed, face angle, or swing path. Launch monitors 34 may also output mathematically calculated shot metrics based on measured shot metrics for additional shot metrics such as apex, distance from centerline, shot distance, carry, roll, flight time. The tracking system 30 may utilize one or more of the additional shot metrics or may determine one or more of the shot metrics from actual measurements obtained from sensor network 33 other than launch sensors, such as those described above, e.g., radar devices 31, cameras 32, laser devices 36, or combination thereof. Launch monitor sensors may be positioned in tee boxes to measure shot parameters for tee shots. In further embodiments, launch sensors may be positioned along fairways or elsewhere to measure shot parameters for shots taken in or around the fairway.

In some embodiments, shot metrics obtained from launch sensors, ball flight data collected by sensor network 33, or combination thereof, are used to generate tracer data that traces a ball flight of a ball after being hit. The tracking system 30 or a production platform 40 may use measured or calculated shot parameters or other ball tracking data to generate tracer data for shots, such as shots from any location on the course. The tracer data may comprise or be used to generate tracer graphics for integration with video data of shots, such as by layering over the video data. For example, launch sensors, such as radar devices, cameras, laser devices, or combination thereof, may be positioned in or around each tee box to capture ball launch data used to generate tracer graphics of each tee shot. As noted above, tracking system radar device 31, lasers devices 36, cameras 32, or combination thereof may additionally or alternatively be utilized to measure shot parameters to obtain shot metrics including flight path of balls that may be used to generate tracer data. As described in more detail below, in one configuration, video data, image frames from video, or programs including video of shots may be processed for incorporation of shot parameters, shot metrics obtained therefrom, or both to generate tracer graphics for integration into video. In one example, the production platform 40 or production processor 41 thereof is configured to layer generated tracer graphics over the video collected of the traced shot. The graphics for layering may be provided in HTML or other suitable format for integration into video or stand-alone graphics As described in more detail below, holes or other course locations may be associated with rundowns including production elements that provide a blueprint for live production of programs. Rundowns may include production elements such as production algorithms, graphics, and pre-produced video. Production algorithms may instruct camera switching, which may include switching between video feeds of camera sources, graphics integration, or other program production steps, such as those described herein. Production algorithms may specify one or more switching operations with respect to the occurrence of an event activity, such as players entering a tee box 27, hitting a ball, hit ball reaching its apex, hit ball coming to rest, or all players finish hole. For example, the production algorithm may instruct switching from a tee box 27 camera source feed to a fairway 28 camera source feed when a ball hit from the tee box 27 reaches its apex. A switch triggering event activity may be identified by a production operator viewing a video feed of play. In some embodiments, the tracking system 30 tracks play for the occurrence of event activities, such as tracking the ball flight of the ball, and identifies when switch triggering event activities occur, such as when players enter a tee box, set up over a ball, enter a green zone, hole out, or exit a green zone, or a ball is hit, reaches its ball flight apex, lands, or comes to rest. The tracking system 30 may generate a signal that indicates the occurrence of the event activity or otherwise output the tracked golf data as to be available for use according to the production algorithm, e.g., to prompt a production operator to take a specified action or the production processor 41 to perform a switching or other production operation. In one example, the production processor 41 is configured to display event activities in a production element switcher interface that a production operator views to identify switch triggering event activities. In one embodiment, the production processor is configured for autonomous switching and the tracking system 30 or production processor 41 identifies switch triggering event activities in the golf tracking data, media data or both, specified by the production algorithm. In addition to switching between camera source feeds, switching may also include switching to or incorporating graphics into feeds, displaying graphics or pre-recorded or other video between camera source feeds, addition or modification of audio sources or audio clips, or other production steps.

Media data collected by the media data collection network 20 provided to the production platform 40 for production processing. Camera and audio sources may provide continuous video and audio outputs available for recall by the production processor 41 throughout the round for use in switching operations. The video and audio data collected by the cameras 21 and one or more microphones 22 for each course position may be provided to the production platform 40 as separate or combined media feeds. The production platform 40 or production processor 41 thereof may include ingestion software to ingest the media data and golf tracking data collected by the media data collection network 20 and tracking system 30. While separate camera and microphone sources may be used, the present embodiment will be described with respect to the various production processing aspects as camera sources providing a combined media data feed from including video data collected by a camera 21 and audio data collected by one or more corresponding microphones 22 associated with a course position.

Microphones, cameras, or the audio or video output therefrom may be adjusted or modified for consistency for when the production processor 41 switches between media sources. For example, audio levels for each camera position may be adjusted so that when the production processor 41 switches cameras the associated audio is consistent across the course positions. Consistency across course positions with respect to video appearance may be assisted by shading cameras 21 to match colors and brightness to match when the production processor 41 switches between camera sources. As noted above and elsewhere herein, one or more microphones 22 may be associated with each camera position. When multiple audio sources are available for a camera position, the captured audio data may be mixed to provide an audio mix for the camera feed from that position such that switching operations with respect to the camera source provides the video and audio mix for that position. For example, a tee box camera position on hole 1 may include a camera 21 to collect video of action in the tee box and two or three different microphones 22 at the location. The audio data from these microphones 22 may be mixed to create a single audio mix for the hole 1 tee box camera position such that the camera source feed assigned to the hole 1 tee box camera position includes the video data captured by the camera 21 and an audio mix of the audio data captured by the microphones for that position. Thus, each camera source may include a camera feed and audio feed, that may include an audio mix from multiple microphones 22, for the position on course. When audio is not desired, audio feeds may be excluded.

In various embodiments, the production platform 40 includes or incorporates encoding operations of an encoder 412. The live media feed from the camera source may be input to the encoder for encoding and transmission to the production processor 41, which may include streaming of the encoded media data to the production processor 41. As noted above, all or a portion of the production processor 41 may operate in a cloud computing environment. While the present description generally described operation in a cloud computing environment, it is to be appreciated that some embodiments may additionally or alternatively utilize computing resources that are not cloud-based. While the production platform 40 is illustrated as including encoder 412, some embodiments may not incorporated an encoder 412 for transmission to the production processor 41 or may include an encoder 412 separate of the production platform 40.

As introduced above, camera sources for each course position may comprise a media feed comprising a video feed from a camera 21 and an audio feed from one or more microphones 22. In various embodiments, the encoder 412 includes multiple channels wherein each camera source is assigned to an encoder channel. For instance, each camera source may be provided a unique channel for media feed output from the course. In one example, a camera position for hole 1 tee box includes a camera feed from a camera 21 positioned to capture play in the tee box of hole 1 and an audio feed mix from microphones assigned to the position. This media data feed may be routed or otherwise supplied to a first encoder channel of the encoder 412 for encoding. The encoded media data output from the encoder 412 comprises a camera source feed for the hole 1 tee box position that the production processor 41 utilizes in production switching operations. Similarly, hole 1 fairway camera position may include the media data feed from a camera 21 positioned to capture play on the fairway of hole 1 and one or more microphones 22. This media data may be supplied to a second encoder channel for encoding to provide a camera source feed for the hole 1 fairway position. Hole 1 green camera position may include the media data feed from a camera 21 positioned to capture play on the fairway of hole 1 and one or more microphones 22. This media data may be supplied to a third encoder channel for encoding to provide a camera source feed from the hole 1 green position. In some embodiments, each channel may have multiple inputs. For instance, input 1 may be the live camera source media feed input from the course for the corresponding camera position, input 2 may be a loop file to playback during testing, and input 3 may be an identification slate file for playback during testing. A loop file generally refers to video that replays over and over, which may be used for testing where live cameras are not available.

The media data feeds may be streamed to and from the encoder 412 by wired or wireless protocols. In one example, media data feeds are input into the encoder 412 onsite or offsite and the resulting encoded live media data feeds are streamed to the production processor 41 by wired or wireless protocols, e.g., by streaming the encoded media data. The encoded live feed may also be streamed to one or more other components of the production platform 40. In one embodiment, the encoder 412 is configured to stream the encoded media data to AWS Media Connect, which may operate as a distribution point to the production platform 40.

Figure 5:
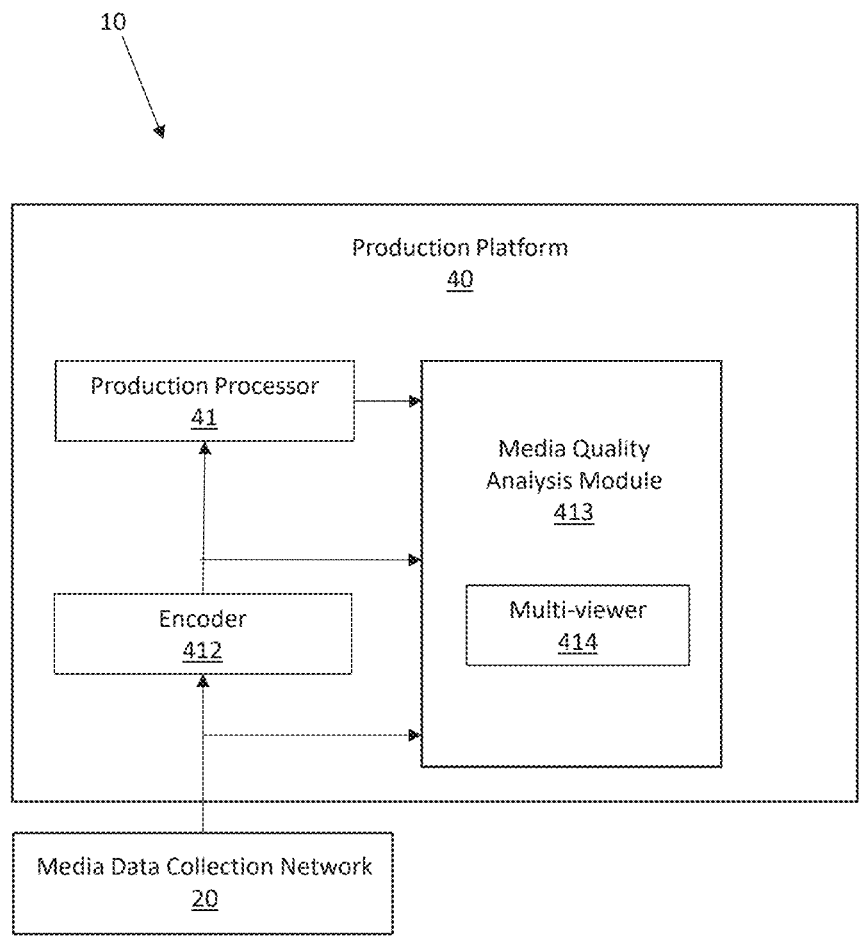
FIG. 5 is a schematic of aspects of a production platform of a golf event production system according to various embodiments described herein.

With further reference to FIG. 5, the production platform 40 may include or communicate with operations of a media quality analysis module 413 configured to monitor media data for degradation or other discrepancies. In the depicted configuration, live media data feeds are streamed from the media data collection network 20 to the media quality analysis module 413 for analysis. Media data encoded by the encoder 412 may also be streamed to the media quality analysis module 413. The media quality analysis module 413 may analyze the encoded live media data feed relative to the uncoded live media data feed and monitor the video for degradation or other discrepancies. For example, the media quality analysis module 413 may include or incorporate one or more multi-viewers 414. The multi-viewers may present unencoded and encoded media data feeds next to each other for comparison to ensure encoded feeds provided to the production processor 41 are consistent with the corresponding unencoded feeds. In some embodiments, the multi-viewer 413 receives media data feeds that include both video and audio and monitors for audio consistency, dropout, or other discrepancies in addition to video. The media quality analysis module 413 may be employed to monitor the media data feeds and provide an alarm if audio drops out, signal is degraded, or other discrepancies arise. For example, camera positions, each including a camera and one or more microphones, may each output a live media data feed comprising a combined video and audio data stream on a unique encoder channel. The encoded and unencoded data feeds may be monitored by personnel using multi-viewers 414. In one embodiment, the quality analysis module 413 is configured to perform autonomous quality analysis between unencoded and encoded data feeds utilizing video or audio comparison techniques such as content matching using image identification and processing to compare video or image frames thereof for matched or mirrored content.

In one embodiment, program outputs produced by the production processor 41 may be streamed to the media quality analysis module 413. The programs may be monitored for video and audio integrity. This may include presenting the programs next to corresponding media data, e.g., encoded, unencoded, or both using multi-viewers 414. This may be done by users viewing multi-viewers 414, by using automation techniques as noted above, or combination thereof. As described in greater detail elsewhere herein, the programs may include incorporated graphics, which may also be monitored for integrity by the media quality analysis module 413.

In one example, monitoring and quality control operations of the media quality analysis module 413 are performed onsite wherein multi-viewers receive media data feeds from camera and audio sources from the course and the same media data feeds following encoding by the encoder 412 and streamed to the production processor 41.

The production processor 41 may be configured to perform production processing in the cloud utilizing cloud resources. For example, the production processor 41 may include a production switcher that interfaces to perform production processing in the cloud. All or a portion of the operations of the production processor 41 may reside in a cloud computing environment. The media quality analysis module 413 may be configured to monitor the cloud source output to provide an alarm if audio drops out, signal is degraded, or other discrepancy arises. In one embodiment, an output from flow is created from a media transport service flow from the cloud to a multi-viewer 414 for analysis of the encoded media data feed streamed to the production processor 41. The live media data feed from the camera source may also be supplied to the same or different multi-viewer 414 and displayed next to the output flow display from the cloud to compare the camera source feed from the course with the encoded camera source feed streamed to the cloud. For example, eighty camera positions, each including a camera and one or more microphones, may each output a live media feed comprising a combined video and audio stream on a unique channel from the encoder 412. The live media feed from each channel may be encoded and streamed over the open internet to the cloud in a media transport service flow. An output flow from the cloud of the encoded and streamed media data from the live media data feed may be analyzed by the media quality analysis module 413 for audio and video discrepancies, such as a difference in video or audio quality, a dropout of audio or video, or degradation in the signal. The analysis may be performed by comparison with the live media data feed and the output flow from the same live data media feed that was encoded and streamed to the cloud, which may additionally or alternatively include application of autonomous matching techniques, such as those described above.

Figure 6:
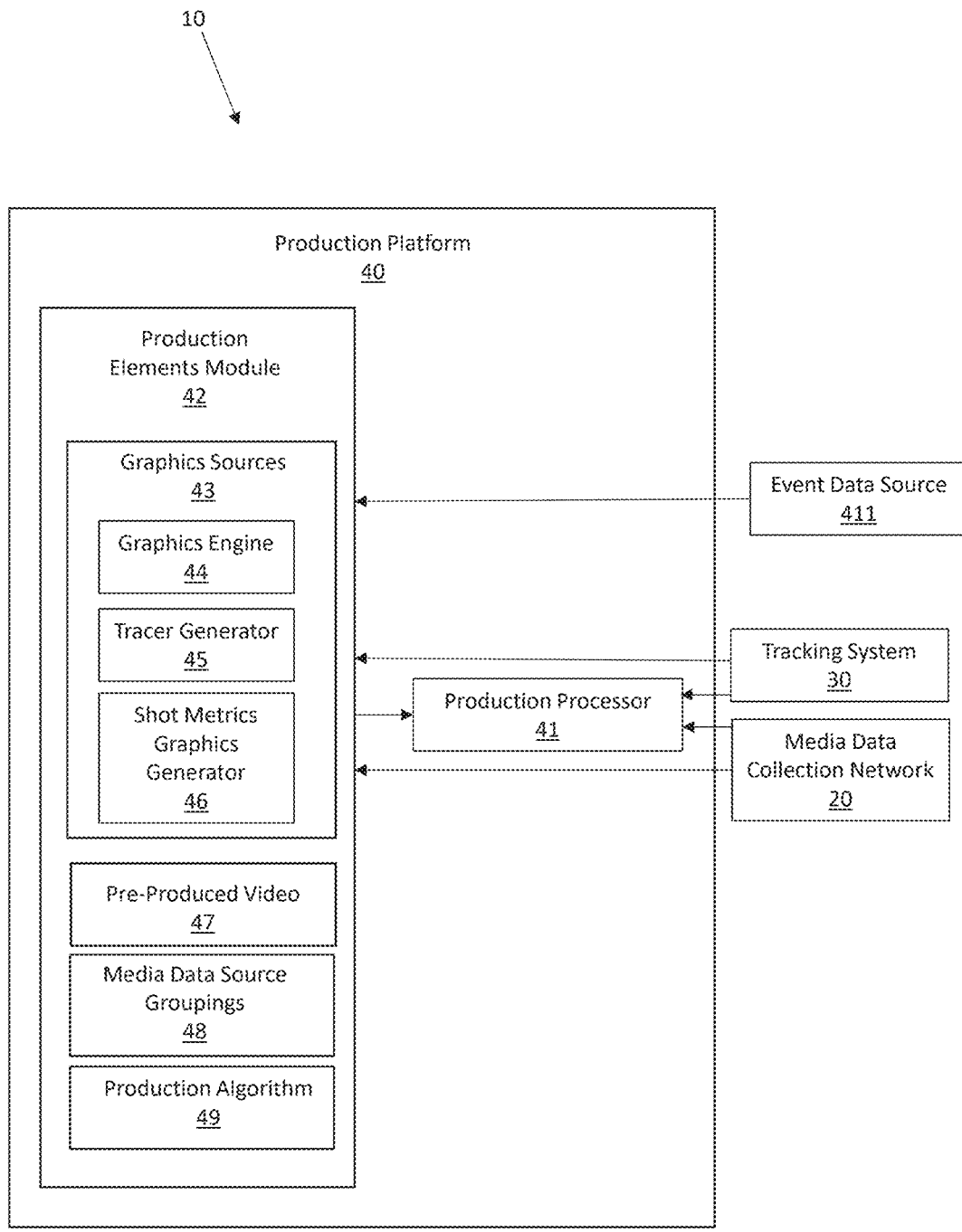
FIG. 6 is a schematic of aspects of a production platform of a golf event production system according to various embodiments described herein.

With further reference to FIG. 6, the golf event production system 10 may include or incorporate operations of a production platform 40 including a production processor 41 configured to receive and process golf data collected by the media data collection network 20 and tracking system 30, or data derived therefrom, to produce programs of golfers or groups of golfers. The production processor 41 is configured to perform switching operations with respect to the media data to produce programs, which may also include integration of graphics, pre-produced video, or other production elements. The production processor 41 may include a processor and memory storing instructions that when executed by the processor are employed to perform the operations of the production processor 41. The instructions may include a production application executed by the production processor 41. For example, the production processor 41 may comprise a production application including instructions that when executed by a processor perform the operations of the production processor 41.

As introduced above, the golf data may include media data including video data and in some embodiments audio data. The golf data may further include golf tracking data or data, such as graphics, derived therefrom, e.g., scoring data, statistics, ball location, player location, ball flight calculations, tracer graphics, or scoring graphics, to name a few. The production platform 40 may utilize golf data for each player or group of players from their first shot to their final shot of the day, from the first hole to the last hole, to produce a unique program for each player or group of players on the course utilizing the video data, audio data, and tracking data. In one example, the production processor 41 creates a unique program for each group of players. Programs for each player in the group may be compiled from the group program. Play-by-play or highlight programs may additionally or alternatively be created from player group or player programs. For instance, the production platform 40 may be configured to process the golf data to produce one or more programs for every group of golfers, covering every shot of every player in the group. Each program may include production elements integrated therein such as graphics. Exemplary graphics may include live scoring graphics, pre-produced graphics, tracer graphics, shot metrics graphics, or other graphics.

As described in more detail below, the production platform 40 may include a production element module 42 configured to generate or otherwise provide various production elements to the production processor 41. Production elements may include graphics generated or provided by one or more graphic sources 43. Graphic sources 43 may include one or more of a graphics engine 44, tracer generator 45, or shot metrics graphics generator 46. Graphic sources 42 may receive golf tracking data collected by the tracking system 30 and incorporate such data into graphics, which may include generation of live graphics. In some embodiments, graphic sources 43 may be configured to receive media data for generation of graphics. For example, the tracer generator 45 may receive video data or image frames thereof for generating ball flight tracer graphics. In some embodiments, production elements may include pre-produced video 47. In one embodiment, production elements may include media data source groupings 48 comprising groupings of media data sources that the production processor 41 utilizes to configure switching operations with respect to a production algorithm 49.

Production processing with respect to the production platform 40 may be performed on-site, off-site, or combination thereof. In one embodiment, all or a portion of the operations of the production platform 40 may be cloud based. For example, video and audio data feeds from the media data collection network 20 may be streamed to a cloud computing environment including all or a portion of the production processor 41 and programs may be produced in the cloud computing environment.

As introduced above, the production platform 40 may include a production element module 42 configured to receive production elements, generate production elements, or both that the production processor 41 utilizes to produce the programs. Production elements may provide a blueprint for live production of programs and include graphics provided by graphics sources 43, pre-produced video 48, or both. Graphics may be pre-produced or updatable with current or live data. The production processor 41 may utilize tracking data, e.g., scoring data, shot metrics, or other tracking data, to generate graphics, such as live scoring graphics, for use in programs. For example, production elements comprising graphics with updatable fields may be available for recall and the production processor 41 may be configured to integrate the live scoring data into the fields. Additionally or alternatively, a graphics engine 44 or other graphic source 43 may provide updated graphics incorporating tracking data on the fly, in real time, upon request by the production processor 41 or otherwise.

Production elements may include a production algorithm 49. The production algorithm 49 may provide instructions with respect to how the production processor 41 is to produce programs, e.g., employing switching operations among camera sources. For instance, production algorithms 49 may provide specific switching operations for covering each golf shot, what to play between shots, and what happens after the players finish a hole. For example, the production algorithm 49 may instruct display of leaderboards, shot graphics for hole scores, shot or to the hole yardages, scoring data related to holes, or other elements between shots. As another example, when players finish a hole, the production algorithm 49 may instruct switching to a camera source feed capturing the players walking off the green, followed by switching to a beauty shot camera source feed, and then displaying a live leaderboard graphic.

In one embodiment, when players of a group finish a hole, the production processor 41 is configured to display or access production elements with respect to a next hole. In one configuration, the production algorithm 49 may specify switching to a view of the next hole following completion of a hole. The view may comprise an image, live video, pre-recorded video, or flyover of the actual hole or generated graphical depiction of the hole. The view may be accompanied by additional hole information graphics, such as yardage, hole strategy, historical play on the hole, play of other players or player groups on the hole, hole features, or other hole information. The additional hole information may generally include tracking data, event data, or both. Tracking data may be provided by the tracking system 30. Event data may be provided by an event data source 411. Examples of event data may include hole strategies, course maps, course information, course history, tournament history, player biographical information, event sponsor information, player groupings, tee times, event calendar, or other information related to the event, competition, series, or professional association; or other event related information that may be integrated into graphics. In one example, event data sources 411 may include or incorporate media guides or media guide content to provide certain event data. Additionally or alternatively, such information may be integrated in pre-produced graphics generated by the graphics engine 44.

Figure 7:
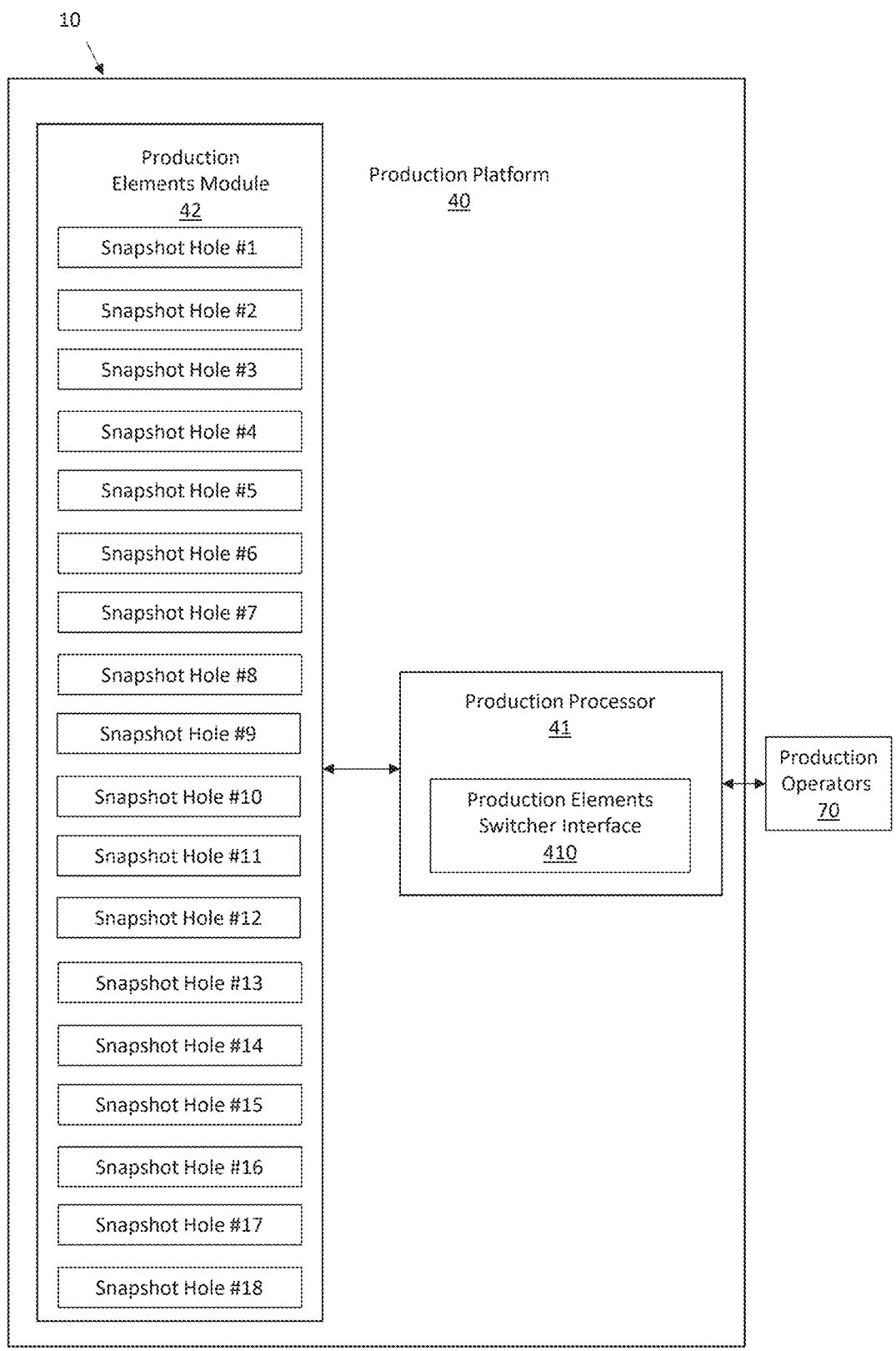
FIG. 7 is a schematic of aspects of a production platform of a golf event production system according to various embodiments described herein.

Production elements provided by the production element module 42 may be referred to herein as being provided or otherwise specified in one or more snapshots. For example, the production elements may be packaged or grouped in production snapshots that may be recalled or otherwise integrated in the operations of the production processor 41 for program production in real time. The snapshots represent a portion of all the production elements available for production of a program. With further reference to FIG. 7, the production elements module 42 may provide grouped production elements packaged by hole for recall by the production processor 41. Recall may be on demand or production elements or portions thereof may be preloaded into the operations of the production processor 41. In one example, recalling preloaded production elements causes updating of live scoring graphics and connection to media data feeds of camera sources associated with production elements, e.g., hole snapshot. While snapshots are generally described herein as being specific to holes, it is to be appreciated that a snapshot may be applicable to or different for all holes, particular holes, specific player groups, specific players, or otherwise. For example, one or more hole snapshots for a first player group may be different than snapshots for the same hole of another player group. Snapshots may be the same for all player groups. Snapshots may divided by hole par designations. In one embodiment, all holes may be specified by a single snapshot.

Snapshot production elements may include an applicable production algorithm 49. The snapshot production elements may include identification of media data source groupings 48, such as camera sources, with respect to holes or locations that the production processor 41 uses to associate the corresponding media data, which may generally include video and audio data feeds, associated with the camera source with the production operations for that portion of the program the snapshot relates. For example, the production processor 41 may apply the media data source groupings 48 for a hole snapshot to link the corresponding camera sources for the hole to the switching operations accessible via a production element switcher interface 410. The sources may also be labeled as to correspond with the production algorithm 49. For example, a camera source media data feed from a tee box for hole 1 may be labeled as camera 1 or tee box and linked to the switching operations executable by the production processor 41 for that camera source. Thus, when the associated production algorithm 49 specifies switching to camera 1 on hole 1, switching to camera 1 switches to the feed of the linked camera source. One hole 2, the media data source groupings 48 for hole 2 may be integrated with the production element switcher interface 410. A camera source media data feed from hole 2 corresponding to the tee box position may be labeled camera 1 or tee box and linked to the switching operations executable by the production processor 41. For example, when the snapshot for hole 2 is integrated into the production element switcher interface 410 for production operations on hole 2, switching to camera 1 or tee box camera source causes switching to the hole 2 tee box camera source.

Production elements may include shot numbers, pre-produced videos, pre-produced graphics, and live scoring graphics. The production processor 41 may integrate or recall the production elements into switching operations. For example, production elements may be accessible for use in switching operations by the production processor 41. The production element may be stored by or be accessible to the production processor 41. In one embodiment, when the production processor 41 switches to a live graphic, a request is sent to the graphics engine 44 to generate data fields including the live data. In another example, the graphics engine 44 maintains live graphics and transmits the live graphics upon request or continuously for use by the production processor 41. Thus, live graphics may be updated in real time and available for real time use. In an above or another example, the production processor 41 is configured to receive live golf tracking data, such as scoring data, from the tracking system 30 and utilize the live data to populate or update live data fields when the graphic is provided or selected for a switching operation.

Graphics may be generated from scoring data or other data in the golf tracking data collected by the tracking system 30 or otherwise, which may include statistics with respect to current or historical play. For example, the production platform 40 may include or integrate one or more graphic sources 43, such as graphics engines 44, tracer generators 45, or shot metrics graphics generators 46, configured to generate and provide graphics to the production processor 41 for program integration. In some embodiments, graphics may be generated with respect to shot metrics or location derived distances comprising one or more of swing speed, shot distance, distance to pin before shot, distance to pin after shot, club, ball speed, or zone location of ball for integration into programs. In a further or another embodiment, shot number or score may also be provided by the tracking system 30 for graphics integration by the production platform 40 or production processor 41. Additionally or alternatively, an observer may enter a player location, current swing action, ball hit, ball land, or combination thereof into an electronic communication device 35 that the tracking system 30 provides to the production platform 40 for linking video data, audio data, or both to a player. It will be appreciated that cameras 32 of the tracking system 30 may include cameras 21 of the media data collection network 20 or the media data collection network 20 may otherwise incorporate player recognition, swing recognition, ball recognition, or combination thereof to identify players, swinging action, ball movement, or combination thereof in video data that the production processor 41 utilizes to assemble player or player group programs comprising and which may further incorporate graphics, which may include live scoring. The graphics may further include statistics of players, groups, field, tournament, season, or other statistics collected by the tracking system 30 as described above and elsewhere herein, such as shot distance, distance to pin, swing speed, ball speed, ball spin, apex height, greens in regulation, putting statistics, or the like.

In one embodiment, the production platform includes a graphic source 43 or connects to a graphic source 43 comprising a graphics engine 44 configured to generate graphics that incorporate or are configured for incorporation of tracked golf data, such as scoring, statistics, shot metrics, or other golf data tracked by the tracking system. Tracked golf data may be ingested by the graphics engine 43 to create scoring graphics. The graphics engine 43 may also incorporate course detail data into graphics. The production platform 40 may provide the production processor 41 with the graphics generated by graphic sources 43 for integration into the program video assembled by the production processor 41 from the camera sources. The graphics may be provided in any suitable format, such as HTML. In one embodiment, the graphics engine 43 may access or receive event data from an event data source 411 including event data. Event data may include play schedules, biographic data, player historical performance, course history, course maps, course strategy, tournament sponsors, or other data for integration in to graphics. In one example, the graphics engine 43 utilizes play schedules, such as scheduled tee times for groups, to create slates for display, such as before the beginning of a program or during a program. For instance, the event data may identify group 1 tees off at 7:45 AM and includes three players. This data may be utilized to generate a slate graphic including the player names, tee times, which hole the group is starting from. Other information, such as a group number may be included. This graphic may be used to give a program viewer an explanation of what program is coming up or when or where to find a program of the group.

As introduced above, tracked golf data, such as scoring data, may be ingested by the graphics sources 43 or production processor 41 in real time to generate live scoring graphics for each group. The graphics engine 44 or production processor 41 may interface with the tracking system 30 to receive scoring data. In one example, the tracking system 30 may transmit all or a portion the tracking data on-demand. In one example, the graphics engine 44 or production processor 41 interfaces with the tracking system 30 utilizing an application program interfaces. The application program interface may enable the graphics engine 44 or production processor 41 to push, pull, listen, or otherwise receive desired golf tracking data when available or on-demand. The shot metrics graphics generator 46 may similarly interface with the tracking system 30 or launch monitors thereof to receive shot metrics data with respect to shots to generate live graphics. Live shot graphics may include leaderboards, shot graphics for hole scores, shot yardages, or player, group or field scoring data on a hole, as examples. Graphic sources 43 or the production processor 41 may be configured to automatically generate or populate live scoring graphics from scoring data or other golf tracking data for groups, players, or both that the production processor 41 integrates into the produced program in real time. For example, the production processor 41 may receive graphics from the graphics engine 44 including live scoring graphics generated from the scoring or related data collected by the tracking system 30. Graphic sources 43 or the production processor 41 may be further configured to dynamically update the live scoring graphics in the program to display names of the players in a group, e.g., determined by player identification, their current scores, player to shoot next, hitting order, stroke count, shot distances, distance to pin, statistics with respect to the hole, round, tournament, or other tracked golf data. In some embodiments, graphics may be integrated into the program including live leaderboards, tournament tee times of the group that is the subject of the program or other groups, or dynamic slates.

As introduced above, the golf data tracked by the tracking system 30 or provided to the tracking system 30 may also include ball flight data collected by various ball tracking sensors of the sensor network 33, which may include launch sensors. The ball flight data may be used by graphic sources 43 to generate tracer graphics of shots. For example, graphic sources 43 may include a tracer generator 45 configured to generate tracer graphics depicting ball flights from actual or calculated ball flight data for integration into the video of the corresponding shots by the production processor 41. For example, the tracer generator 45 may be configured to generate a tracer of each tee shot or other shots that the production processor 41 integrates into the video data of the shot scene in real time or essentially real time, e.g., near real time. The integration may be automatic or selective upon a switching command executed via the production processor 41 to select a graphic for integration. Thus, programs output from the production processor 41 may include tracer graphics of shots. For instance, a group program may include integrated tracer graphics of shots of the players in the group and be displayed in the respective scenes of the traced shots to depict the ball flight of the ball hit by the respective players. In one embodiment, tracer graphics representing the ball flight data are provided to the production platform 40 or production processor 41 in HTML and are added to the camera source feed in the production by the tracer generator 45 prior to input into the production. Thus, the live feed subject to switching operations by the production processor 41 may incorporate the tracer graphics at the time of switching.

As noted above, image frames may be utilized for tracer graphic creation. The images may be used for location reference. For instance, image frames created from the video feed capturing the shot, such as a tee box camera for a drive, and sent to the tracer generator 45. The video data may be from an encoded video stream. The tracer generator 45 may utilize the images as a reference to where the ball is being tee'd up for a shot, which the tracer generator 45 uses to determine where to originate and start drawing the tracer. The tracer graphic may be provided to the production processor 41 and the production processor 41 may layer the tracer graphics, which may be provided as an HTML source, over the video data captured by the cameras.

The tracked golf data may additionally or alternatively include shot metrics, e.g., collected or calculated using data collected by launch monitors 34 or other sensors of the sensor network 33. Graphics providing one or more of the tracked shot metrics may be generated by a shot metrics graphics generator 46, which may comprise graphics engine 43 or another graphics engine. The shot metrics graphics generator 46 may be a component of the production platform 40 or be in communication with the production platform 40.

The generated shot metrics graphics may be fed to the production processor 41 and therein integrated into the program video as described above with respect to the tracer graphics. The integration may be automatic or selective upon a switching command of the production processor 41 to select a shot metrics graphic for integration. The shot metrics graphic generator 46 may be a separate or the same graphic source as one or more of the graphics engine 44 or tracer generator 45 when present. In one embodiment, the shot metrics graphics generator 46, tracer generator 45, and graphics engine 44 comprise separate graphic sources. Shot metrics graphics may include graphics identifying swing speed, exit velocity, carry distance, total distance, rollout, smash factor, apex height, attack angle, face angle, or other shot metrics.

Graphics may be incorporated in to programs for display with live media data or between live media data. For example, video feeds may be overlaid with graphics. The graphics may include, for example, tables; boards; animations of holes, shots, shot locations, or other location or activities; graphic bugs; scroll bars; or augmented reality graphics. Graphic bugs are small graphics that layer over video. Graphic bugs can be placed at various locations of a video display, such as an upper corner or a lower corner. In one example, a graphic bug is used to show ball flight distance, curve of the shot, or other ball flight data or shot metric, and may be placed in an upper corner.

With particular reference to FIG. 7, the production element module 42 may group production elements in snapshots by hole that may be recalled by the production processor 41. As described above with reference to FIG. 6, snapshots may include graphics for use in production of programs. In some embodiments, snapshots include pre-produced video 47. Snapshots may include a production algorithm applicable to production of the program for the hole. Snapshots may also include media data source groupings 48 that group camera sources. As introduced above, each camera 21 may be associated with one or more microphones 22, when present, to provide an audio mix for the course position it covers. The camera and associated microphone feeds may be combined or paired by the media data collection network 20 or production platform 40 so that when the production processor 41 employs production switching operations for program production, the audio will follow the switch. Media data sources groupings 48 may specify camera positions with respect to the course or production algorithm 49 and may identify corresponding channels of the camera sources for incorporation within the operations of the production processor 41. Thus, when a snapshot including the associated production elements is recalled, the production elements for the hole are grouped together in the production processor 41 such that the production elements are presented together. Groupings may be hole or other division with respect to course location, time, group, round, or tournament. For instance, when the snap shot for hole 1 is recalled, the production elements switcher interface 410 integrates the production elements so when a production operator 70 is producing a program for the first hole, the production operator 70 may be presented only the camera sources, graphics, and, when included, video elements, for that hole. When play moves to the hole 2, the production operator 70 may select the snapshot for hole 2 for recall and the production elements for hole 2 are presented in the production elements switcher interface 410 and so on.

In one example, the production processor 41 is configured to receive switching instructions from a production switcher operator 70 via the production elements switcher interface 410 to produce programs. In some embodiments, all or a portion of the production switching operations may be autonomous. For instance, as described in more detail below, the production processor 41 may be configured for autonomous switching. Some embodiments including production processors 41 configured for autonomous switching may similarly recall appropriate snapshots to produce programs or may be loaded with production elements or portions thereof applicable to the full production. For example, the production processor 41 may recall one or more snapshots corresponding to a program division or may be preconfigured with one or more snapshots or production elements thereof including a production algorithm and corresponding camera source position and feed identifications for program production. In one configuration, a production algorithm 49 may be provided that specifies production steps for a full production of a group or other program.

With particular reference again to FIG. 7, in various embodiments, the production processor 41 is configured to interface with a production operator 70. For example, production operators 70 may interact with the production processor 41 to select camera sources or output channels thereof for assembly of programs. For instance, the production processor 41 may be setup to enable a single production operator 70 to follow a single group of players from their first shot to their final shot of a round, from the first hole to the last hole. When audio data is included in the production processing, camera sources will generally include appropriate audio data, e.g., audio mix, but in some embodiments, audio sources may be provided on separate channels or otherwise as separate sources for switching in a manner similar to that described herein with respect to camera source feeds. The production processor 41 may present production operators 70 with discrete production elements specific to one or more of a player, group, hole, or other location or area on the course, such as one or more of camera feeds, audio feeds, graphics, pre-produced video, or other production elements. The production elements of a snapshot may populate a production element switcher interface 410 of the production processor 41 for instant recall by a production operator 70. Production operators 70 may then interact with the production elements via the production processor 41 to cause the production processor 41 to perform switching operations to produce programs. Utilizing the production processor 41, the production operator 70 may produce a unique program for each group on the course, each player on the course, or both. Each program may include live scoring graphics and natural sound from the course. In some embodiments, programs may also include tracer graphics for shots as described herein. In one embodiment, each hole may be provided with a production algorithm 49 instructing the production operator 70, production processor 41, or both how to produce the program. The production algorithm 49 may be integrated into the production processor 41 or provided to the production operator 70 for use during production operations. The production algorithm 49 may include shot numbers, e.g., shot 1 (tee shot), shot 2 (approach green or putt), shot 3 (approach green or putt), shot 4 (putt), etc. and specify additional production elements such as pre-produced videos, pre-produced graphics, live scoring graphics for input of live scores, such as live scores automatically entered in to live graphics by the tracking system 30, graphics engine 44, or production processor 41.

As introduced above, the production processor 41 may use camera source grouping to identify and recall the appropriate camera feeds applicable to the production algorithm 49 into the production operations. For example, each hole may be associated with a snapshot that the production processor 41 can recall for production operations. Snapshots may be created outside the production processor 41 and a working version may be saved to a production processor 41 data storage resource accessible by the production processor 41 to allow the production processor 41 or production operator 70 to step through each production operation action according to production algorithm 49.

In one example, production operators 70 can recall snapshots utilizing the production processor 41. Recalling the snapshot may cause the production processor 41 to integrate the production elements of the snapshot into a production elements switcher interface 410 for use by the production operator 70. For example, when a group finishes a hole, the production processor 41 may automatically recall the snapshot for the next hole and populate the production elements switcher interface 410 with the production elements, which may include operatively linking the elements, to interface controls. Additionally or alternatively, a production operator 70 may manually recall snapshots. The snapshot may identify the media data source groupings 48 relative to hole positions, production algorithm, or both and tie the switching operations to the grouped data sources. As introduced above, snapshots may include additional production elements such as one or more of pre-produced graphics, pre-produced video, live scoring graphics, tracer graphics, or shot metrics graphics. The production processor 41 may utilize the snapshot to integrate the production elements, e.g., media data source groupings 48 (which may include camera source channels), graphics, production algorithm 49, and, when included, pre-produced video, into the production elements switcher interface 410 and operations thereof. This may include labeling the camera sources, graphics, or other production elements according to appropriate designations used in the production algorithm 49 for the production operator 70 to use when producing the program for that hole.

In various embodiments, production operations are performed by the production processor 41 to create programs from camera, audio, graphics/data feeds and other production elements. The production processor 41 may provide switching operations to produce programs. Switching operations may include, for example, switching from camera 1 to camera 2, or from camera 2 to a graphic, such as a leaderboard. This switching may be software driven via the production processor 41. In one example, the production processor 41 is cloud based and used to produce programs in the cloud from the encoded video and audio feeds. The production processor 41 may ingest the video and audio data feeds from the course and receive production elements for producing programs. The camera sources and production elements may be grouped together in the production processor 41. For example, when grouping is by hole, each hole may have multiple camera sources and production elements. One more of the production elements may be unique to a particular hole. In the production elements switcher interface 410 of the production processor 41, the camera sources and other production elements for each hole are presented together. For example, when a production operator is producing from the 1st hole, the production processor 41 presents only the cameras sources, graphics, pre-produced video, and other production elements from that hole. When play moves to the 2nd hole, the production operator may select or otherwise recall the snapshot for the 2nd hole, which presets all of the production elements for the 2nd hole within the production element switcher interface 410. In one configuration, the production processor 41 automatically resets production elements for a next hole following execution of the last switching operation for the previous hole according to the production algorithm or the occurrence of the first event action specified for the next hole, e.g., player or group enter tee box of next hole.

Additionally or alternatively to program production via interaction with a production operator 70, the production processor 41 may be configured to produce programs autonomously. For instance, the production processor 41 may autonomously control switching between camera source feeds, which may also include associated audio, graphics, or other production elements. Autonomous switching may be informed by tracked golf data. For example, player and shot location provided by the tracking system 30 may be cross-referenced with coverages of camera positions to identify which camera sources are capturing the shots. Ball resting positions, shot numbers, ball in hole, together with identification of group players may also be used in a similar manner to track locations and camera positions covering those locations for subsequent shots and determination of group hole completion. In a further example, a production operator 70 may monitor the operations of the production processor 41 for consistency and errors and modify the autonomous operations as necessary.

In various embodiments, autonomous switching operations may be directed by the production algorithm 49. For instance, the production algorithm 49 may provide instructions defining switching operations among camera source feeds and graphics to produce programs. In one embodiment, switching operations are informed by event activities specified in the production algorithm 49. For example, the production algorithm 49 may specify event activities that trigger switching operations. In one embodiment, event activities are fed to the production processor 41. In one example, the tracking system 30 may output golf tracking data to the production processor 41 relevant to event activities provided in the production algorithm 49 to trigger autonomous switching. For instance, the tracking system 30 may generate golf tracking data such as group entering tee box of a specified hole, player ball locations, player locations, player shot number, player approaching ball, player setting up over ball, player swinging club, ball hit with respect to a player, shot apex, ball landing, ball rolling, ball at final resting position, player shot numbers on holes, player completed hole, or other event activities that the production processor 41 may use to trigger switching operations directed by the production algorithm 49. The occurrence of event activities may be identified and transmitted to the production processor 41, the production processor 41 may analyze golf tracking data and identify relevant event activities, or combination thereof. In one example, the production processor 41 interfaces with the tracking system 30 utilizing an application program interface. The application program interface may enable the production processor 41 to push, pull, listen, or otherwise receive desired golf tracking data when available or on-demand to identify or receive notification of event activities triggering switching operations.

In one embodiment, the tracking system 30, e.g., tracking processor 37 (see, e.g., FIG. 1), production processor 41, or both may utilize the sensor network 33 to detect a player swinging a club, e.g., from a radar device 31. Using one or more of player recognition, playing order, location of player relative to a ball tracked by the tracking system 30 from the player's previous shot, or other tracking data, the tracking processor 37, production processor 41, or combination thereof may tie the player to the ball and track the shot following the hit, e.g., with radar devices 31, cameras 32, laser devices 36 (e.g., LIDAR, laser rangefinders), or other sensors, to the final resting position of the ball on the hole. In some embodiments, time, location, or both of the occurrence of such event activities may be used to automatically identify the camera position capturing the video on the hole at the time to trigger switching between camera feeds.

In various embodiments, the tracking processor 37, production processor 41, or combination thereof may be preloaded with the field of view of each camera 21 with respect to the holes and be configured to utilize tracked player, ball location data, or other event activity location data to identify the camera positions capturing the event activities based on the field of view and tracked location data. This information may be used by the production processor 41 to identify camera sources and automatically assemble video captured of each shot of a player or group of players throughout a round to generate a program according to the production algorithm 49. In some embodiments, field of view may be generalized to hole areas such as tee, fairway, or green. In these or other embodiments, one or more fields of view may be defined by directional view, yardage ranges or map coordinates corresponding to a hole, landing zone, hazards, or other location definition that may be used to identify appropriate camera sources for switching operations.

In an above or another embodiment, the tracking processor 37, production processor 41, or combination thereof employs computer vision or other technique, such as those described above and elsewhere herein, to identify players, balls, or both. This information may be used by the production processor 41 in autonomous switching operations, e.g., to inform or reinforce identification of event activities. In this or another embodiment, the production processor 41 analyzes the video data, e.g., using computer vision, or otherwise, to track players, balls, locations, or other activities to identify event activities or reinforce identification of event activities.

Further to the above, event activities may include golf tracking data collected by the tracking system 30. For example, golf tracking data may include various event activities such as when a ball is hit, when the ball reaches its apex of flight, when the ball lands, when the ball comes to rest. This data, along with the production algorithm 49 applicable to the event, which may include a production algorithm 49 applicable to particular holes, may be used to automate switching to generate programs. The production processor 41 may further utilize one or more other production elements as described herein to produce programs according to the production algorithm 49. As an example, a production algorithm 49 for the first two shots of a hole may include (1) for tee shots, camera 1: (a) until ball is hit, stay on camera 1, (b) when hit ball reaches apex, switch to camera 2, (c) when hit ball comes to rest, switch back to camera 1, (d) repeat for all players in group, (e) after all players hit and last player's ball has come to rest, show leaderboard and graphics 1; (2) for second shots, camera 2: (a) until ball is hit, stay on camera 2, (b) when ball reaches apex, switch to camera 3, (c) when ball comes to rest, switch back to camera 2, (d) repeat for all players in group. After all players in the group have completed the hole, e.g., as informed by completed hole scores for each player, the production processor 41 may recall the snapshot for the next hole and repeat the switching operations for the next hole using the production algorithm 49 applicable to the hole. In one embodiment, a snapshot is used that applies to a full round, e.g., is not subject to division by hole.

The production platform 40 may execute production processing as described above and elsewhere herein to produce programs that follow a player or group of players through a full round of a golf tournament. A program may be produced for each competing player or group of competing players in a round of a tournament. In one configuration, when production operators 70 are used, only single production operator 70 is necessary to produce a program for a group. Thus, each group may be assigned production operator 70 that interfaces with the production processor 41 to produce a program for the group.

In some embodiments, each player or group program is produced by the production processor 41 in multiple versions. For example, a program may be produced in a version with graphics ("dirty") and a version without graphics ("clean"). Clean versions may be utilized for archival or editing purposes following play, for example, or may be provided to clients, partners, or other output recipients that do not wish to have included graphics.

As introduced above, programs may include audio data. In one embodiment, audio data includes natural sounds picked up by microphones 22. In this or another embodiment, audio data includes a commentary track. Commentary tracks by be included alone or together with natural sounds.

Figure 8:
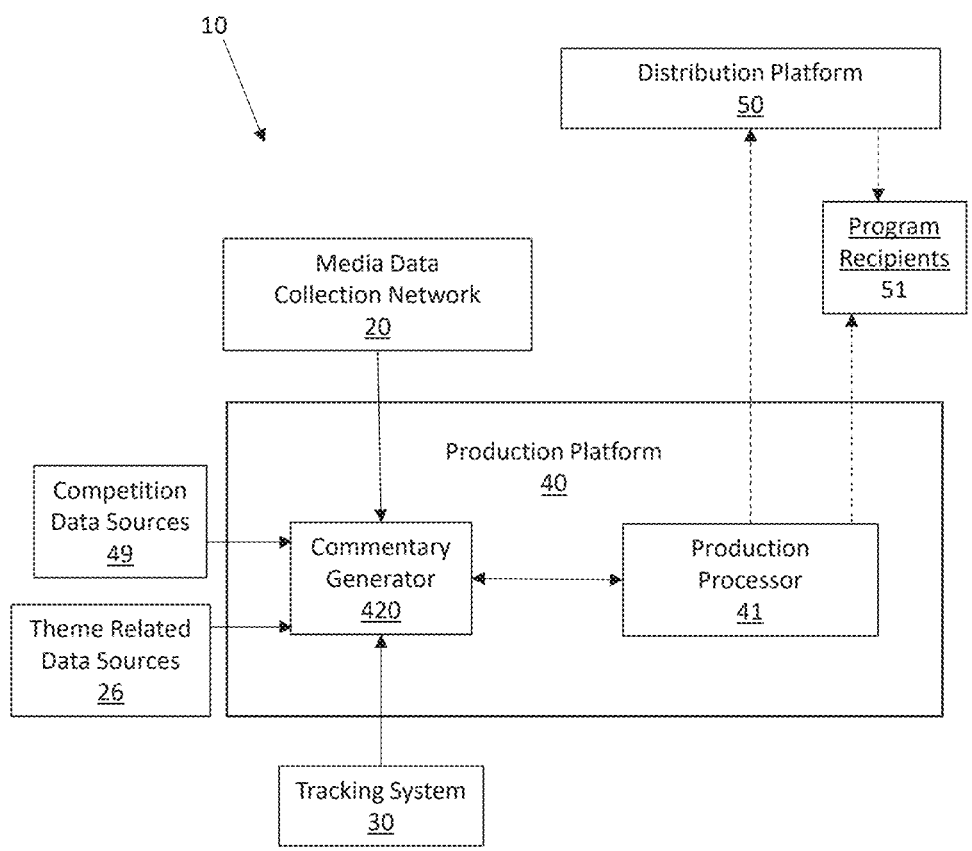
FIG. 8 is a schematic of a golf event production system according to various embodiments described herein.

With reference to FIG. 8, the golf event production system 10 may include a media data collection network 20, tracking system 30, and a production platform 40 comprising a production processor 41 configured to generate programs. The operations of the media data collection network 20, tracking system 30, and production processor 41 may be similar to that described above and elsewhere herein. The production platform 40 also includes or is configured to incorporate the operations of a commentary generator 420.

The commentary generator 420 may one or more of generate, receive, process, or incorporate commentary tracks with respect to programs. Program commentary tracks, or commentary options thereof, may be associated with programs output by the production processor 41 and made available for distribution by the distribution platform 50 to program recipients 51, which may be as described elsewhere herein. It is to be appreciated that in some embodiments program recipients 51 may include the distribution platform 50. In some examples, program commentary options may be available for selection by program recipients 51. For instance, the distribution platform 50 may include a platform interface including commentary or other audio options that an output recipient may select. In one embodiment, various programs with various commentary options may be listed for selection by output recipients via the distribution platform 50. Audio and commentary options may include inclusion or exclusion of natural sound audio, inclusion or exclusion of commentary, or both. In some embodiments, multiple commentary options may be available, as described in more detail below. Such program options may be available for selection by program recipients 51 to customize program audio. In some embodiments, the commentary generator 420 may be configured to generate one or more commentary tracks on demand. In one example, commentary tracks may be requested on demand.

In one embodiment, commentary tracks may be provided by human announcers at the course viewing the action, offsite watching video data of the live action, or otherwise. In the above or another embodiment, commentary tracks may be generated using artificial intelligence/machine learning. In the above or another embodiment, commentary tracks may be fed to the distribution platform 50 with the corresponding video data portions of programs or separately, wherein the distribution platform 50 is configured to output a particular or selected commentary track with the program, which, in one example, may include combining the video and audio into a single stream.

The production platform 40 may be configured to product programs having the same video content but different audio commentary tracks that may be included in their presentation. For instance, the commentary generator 420 may be configured to generate commentary tracks in different languages. In one example, the commentary generator 420 may be configured to translate commentary into one or more other language for presentation in another language in text or audio, which may include computer voicing. In one embodiment, the production platform 40 or commentary generator 420 is configured to convert human or computer generated commentary to text. The text may be incorporated into the program display or processed to generate a commentary track in another language, for further modification, or other use.

In one example, the commentary generator 420 is configured to convert commentary or commentary text to audio using computer generated voicing to provide different commentary voicing. For instance, voice selections may include male, female, regional accents, excitement level, tone, pace, or other voicing characteristics. In this or another example, the production platform 40 is configured to generate the voicings in multiple languages. The distribution platform 50 may then distribute the commentary tracks in desired voicing, language, or both as requested by program recipients 51. In one embodiment, commentary tracks may be available for output with programs that are generated by selectable personalities or users.

In some embodiments, the commentary generator 420 may be configured to generate commentary tracks that correspond to different points of view. Commentary points of view may include color analysis, play analysis, statistical analysis, player focus, or other point of view. In one example, a commentary point of view may include course or play strategy analysis that breaks down shots, provides strategy with respect to next shots and how that or other strategies may impact scoring. Commentary may incorporate graphics displayed in the video data portions of programs. For example, displayed graphics of course hazards, terrain, putting surfaces, and the like may be displayed in conjunction with descriptive commentary, strategy commentary, or both that relate to the displayed graphics. In one example, a commentary point of view may include stroke analysis providing analysis of player swings during live play. Points of view may also include commentary with a historical angle that incorporates historical discussions of the course, tournament, play, or player comparisons. A point of view may include rule analysis that provides a focus on rules impacting play and decision making on the course. In one example, commentary may include a betting point of view. Betting commentary may discuss or display graphics including odds with respect to the play, discuss impact of shots or play on relevant bets or betting options, provide betting tips, or other betting related discussion. In some configurations, multiple commentary points of view may be combined to provide a point of view with one or more desired themes. For example, a color analysis point of view may be provided with one or more of a historical, betting, or play strategy theme. In various embodiments, the distribution platform may provide program recipients 51 selectable options for commentary including one or more points of view, themes, or combination thereof.

As introduced above, different commentary track languages, points of view, or themes may be provided by humans, artificial intelligence/machine learning, or a combination thereof. For example, the commentary generator 420 may include a commentary generative model configured to autonomously generate commentary utilizing artificial intelligence/machine learning, e.g., using generative AI models, large language models, or both. For instance, using a combination of assets such as scoring data, which may include other golf tracking data, video data, or both, a commentary track may be created. Scoring data may be provided by the tracking system 30 or another system. The scoring data may include that described herein with respect to golf tracking data, such as player name, hole, hole location, club, score, stroke number, approaching ball, hitting ball, distance, or leaderboard position, as examples. Golf tracking data may also include shot metrics. Video data may correspond to the program video or other video of the player or other players. In some embodiments, assets used in commentary generation models may include competition data including information about the competition and competing players, such as course and hole features, biographical data, historical performance of players, past tournament, or the like. The commentary generator 420 may access the assets in one or more data sources such as competition data sources 415 or theme data sources 416. In some embodiments, competition data sources 415, theme data sources 416, or both may be the same or similar to event data sources 411 described above with respect to FIG. 6. In one example, competition data may be provided by media guides. Further to the above, the commentary generator 420 may generate commentary tracks with respect to different points of view, such as those described above and elsewhere herein. For instance, commentary tracks may correspond to play analysis, color analysis, statistical analysis, or other point of view. Commentary tracks may be provided as selectable options that program recipients 51 may select. In some embodiments, programs may be provided or output with multiple selectable options that viewers may interact with to turn commentary on or off, specify a language, select a point of view, or combination thereof. In one example, voicing options, such as those noted above, may additionally or alternatively be provided.

In one example, the commentary generator 420 includes a generative AI, large language model, or combination thereof configured to generate descriptive commentary of what the viewer is seeing, how the golfers are competing against the field, and other aspects of the competition, such as historical references to previous tournaments or play. The model may be built from descriptions of a single golf shot and expanded to describe how a golfer is playing throughout their round. In one example, the model may use only golf tracking data, such as just scoring data. In a further example, the model may use other assets, such as media guides and video data, e.g., provided by competition data sources 415, theme data sources 416, media data collection network 20. In one aspect, autonomous commentary may be generated using a combination of golf tracking data, e.g., provided by SHOTLINK™, and competition data, such as data provided in media guides, along with a large language model. Other assets may also be used. For example, video, such as the program video, may be utilized. For example, computer vision employing object recognition or otherwise may be employed to identify players, event activities, course features, or other aspect in the program video to which related commentary may be generated. The distribution platform 50 may comprise an interface for viewing and include an option to turn on a commentary track in different languages, offer commentary coverage from different points of view, such as play analysis, color analysis, statistical analysis, or other point of view, or other commentary or audio options, such as those described herein.

With reference again to FIGS. 1 & 8, produced programs may be available for distribution, e.g., from the cloud, via a distribution platform 50 or directly from the production processor 41. The programs may be distributed directly to program recipients 51, such as media partners, online streaming platforms, viewing public, or otherwise. In one example, programs output by the production platform 40, or production processor 41 thereof, may be streamed to program recipients 51 comprising media partners, clients, or both. For instance, the programs may be provided directly to partners via an internet stream, e.g., to AWS accounts of partners or hardware decoders. In this or another configuration, programs may be streamed directly to viewing public, such as to consumer level user devices for viewing.

In one embodiment, produced programs are output from the production platform 40 to the distribution platform 50 for distribution. In one example, all or part of the distribution platform 50 operations reside in a cloud computing environment. The distribution platform 50 may provide a platform from which programs may be distributed for further production, distribution, consumption, or otherwise. The program output for each competing group, for instance, may be distributed in the cloud to multiple parties with a media service, which may be a cloud media service such as AWS Media Services. For example, the output of each program may be streamed from the production platform 40 to the distribution platform 50 comprising a media transport service, which may be a cloud based media transport service such as AWS Elemental MediaConnect.

The golf event production system 10 may be configured to distribute programs to parties such as media partners, clients, or other program recipients 51 in various ways. For example, distribution may be via direct feed from the production processor 41 using a suitable media transport network protocol such as Secure Reliable Transport (SRT), Real-Time Transport Protocol (RTP), Real-Time Streaming Protocol (RTSP), ZIXI, or combination thereof. For example, distribution may be via direct feed from the cloud wherein the program is produced in the production processor 41 residing in a cloud environment and streamed from the production processor 41 to the distribution platform 50 comprising a cloud based media transport service, such as AWS Elemental MediaConnect, and then distributed directly to partners or other program recipients 51 completely in the cloud. In one configuration, the golf event production system 10 may grant entitlements to parties to receive direct feeds from the distribution platform 50 such that the programs output are distributed directly to accounts of the entitlement holding parties. In some embodiments, programs may be distributed or available for distribution from the distribution platform 50 via HTTP Live Streaming (HLS) protocol or similar protocol from a content delivery network, such as Amazon CloudFront.

In any of the above or another embodiment, the production platform 40 or distribution platform 50 may be configured to transcode programs into one or more formats for distribution to parties as described above. For example, programs may be transcoded in a cloud-based broadcast-grade video processing service, such as AWS Elemental MediaLive, that encodes the program media for availability for streaming distribution from or on various platforms, which may include distribution using a suitable media transport network protocol such as SRT, RTP, RTSP, ZIXI, or combination thereof, to accounts of parties granted entitlement, or combination thereof. As introduced above, distribution and encoding of programs may be handled with media service resources.

In some embodiments, programs may be further produced by the production platform 40, such as by the production processor 41, or with another platform, or processor thereof, to which the programs are streamed to create a play-by-play feed, highlights, or both. For example, play-by-play clips may be generated from the programs. In some instances, play-by-play clips may have scoring or other golf tracking data collected by the tracking system 30 applied to each video. In one example, video may be published to VMS as soon as it is created. For example, 'play by play' videos/clips refers to the creation of unique programs of each golf shot. Golf tracking data collected by the tracking system 30 may be applied to each of the videos for display via a website and application. As noted above, highlights may be further created from programs or streams thereof. In some embodiments, when a player finishes their round, a compilation of all of their golf shots from the day may be created in a separate program and published.

The golf event production system 10 may further include or communicate with a database for storing programs. For example, the database may comprise an archive of programs created by the golf event production system 10. As noted above, in some embodiments different versions of programs may be created, such as versions with graphics and without graphics. The golf event production system 10 may transmit the program versions to the database for archival storage. Various recording formats may be used such as XDCAM 50, 1080i 2997, 8 channels of audio. Program layout may include audio isolated on extra channels. For example, channels 1-2 may contain the mix, or program mix, which is what a viewer of the output program would hear. Channels 3-4 may contain isolated audio from the tee box. Channels 5-6 may contain isolated audio from the fairway, and channels 7-8 may contain isolated audio from the greens. The multichannel output of isolated audio may be utilized for archival purposes or other applications. In some embodiments, versions may also include play-by-play feeds, highlights, and player compilations generated from the programs. Archived program recordings may be associated with a timecode that matches the stream where the play-by-play feed is created. In some embodiments, logs for each program may be created from the play-by-play videos that are published.

Figure 9:
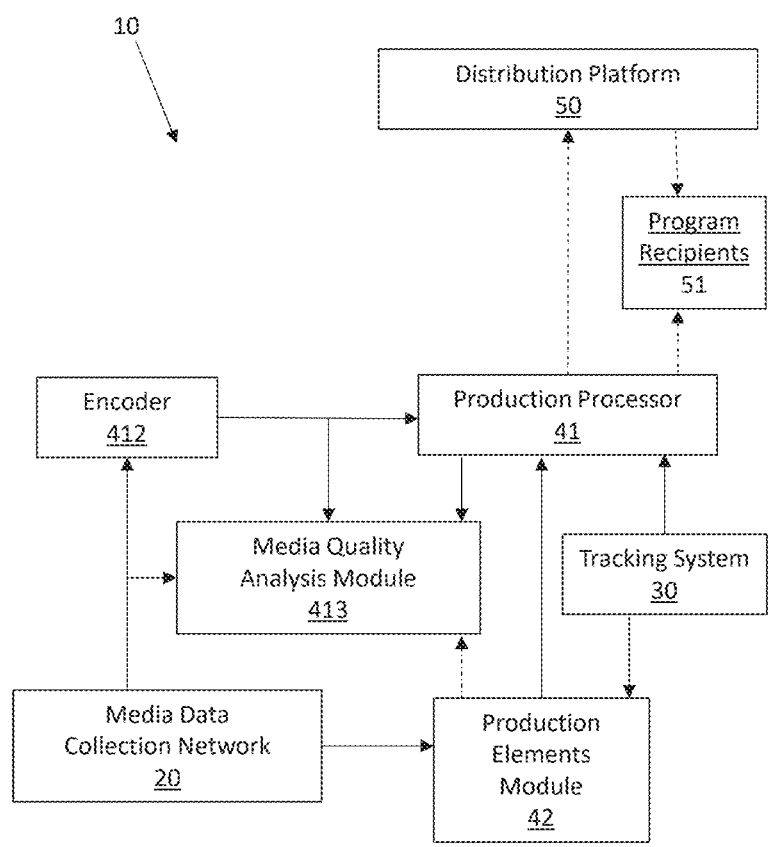
FIG. 9 is a schematic of a golf event production system according to various embodiments described herein.

FIG. 9 is a schematic of a golf event production system 10 including a media data collection network 20 configured to collect media data of the golf event. The media data may include video data captured from cameras positioned around the course. In one example, the media data also includes audio data captured from microphones positioned around the course. The media data may be streamed to an encoder 412 to encode the media data and stream the encoded media data to a production processor 41 configured to perform switching operations with respect to the media data to produce programs as described above and elsewhere herein. The media data streamed to the encoder may be monitored by a media quality analysis module 413. An output of flow from the encoded media data may be created and streamed to the media quality analysis module 413 for monitoring. The unencoded and encoded media data may be output to multi-viewers or otherwise monitored for discrepancies, degradation of signal, and dropout. A production element module 42 may provide production elements to the production processor 41 for use in production operations. The production element module 42 may include or be configured to receive production elements comprising graphics from graphic sources. Graphic sources may be similar to those described above and include various graphic engines, tracer generators, shot metric graphic generators, or other sources configured to generate graphics for use in production processing. The production elements may also include a production algorithm that defines production of programs including switching operations with respect to the media data and graphics. In one example, the production elements also include media data source groupings that define groupings of media sources according to the production algorithm that the production processor 41 uses to integrate the production elements with the switching operations executed by the production processor 41. In one example, the production elements include tracer graphics or other graphics incorporated into or that utilize video data collected by with the media data collection network 20. Thus, the media data collected by the media data collection network 20 or data derived therefrom may be transmitted to the production element module 42 for generation of tracer or other graphics for integration in programs. In one example, the production element module 42 transmits the tracer or other integrated graphics to the media quality analysis module 413 for quality monitoring. A tracking system 30 comprising a sensor network positioned around the course that is configured to track and collect golf tracking data, such as scoring data, player identification, player locations, and ball locations. The golf tracking data may be transmitted to the production element module 42 for use in generating live scoring graphics, leaderboards, or the other graphics incorporating the golf tracking data or derived therefrom. In one embodiment, the golf tracking data may be transmitted to the production processor 41. The production processor 41 may use the golf tracking data to generate or populate production elements comprising graphics models for creation of live or other graphics for use in program production. As described above and elsewhere herein, in some embodiments, the golf tracking data may be transmitted to or otherwise used by the production processor 41 for use in autonomous switching operations. In this or another embodiments, the tracking system 30 transmits event activities to the production processor 41 that the production processor 41 uses to inform switching operations, which may include triggering switches, identification of camera sources capturing the events, or otherwise. The production processor 41 may output programs to the media quality analysis module 413 for quality monitoring, which may include monitoring via multi-viewers, autonomous analysis, or both. The production processor 41 may output programs to the distribution platform 50 for distribution to program recipients 51 such as clients or media partners. Clients or media partners may include broadcast partners, online platforms such as video streaming platforms, other processing platforms, other distribution platforms, direct to consumer end users, archival databases, or other distribution points. In various embodiments, one or more of the media data collection network 20, tracking system 30, encoder 412, production element module 413, production processor 41, media quality analysis module 413, and distribution platform 50 are as described elsewhere herein. For example, the production processor 41 may configured for autonomous switching, include a production element switcher interface for use by a production operator, or combination thereof. In a further or another example, the tracking system 30 may be configured for autonomous tracking of players, balls, or both. In a further or another example, the tracking system 30 may be configured for autonomous tracking of scores. In a further or another embodiment, the golf event production system 10 may include or incorporate operations of a commentary generator.

As described above, cameras of the media data collection network may be fully or partially autonomous. Thus, in one embodiment, the present description describes autonomous live event program generation wherein by video data, and optionally audio data, may be captured automatically by cameras positioned around a course. The cameras may be configured to track players and balls or provide zoom capabilities from static scenes that automatically focus on players or balls, e.g., using computer vision. The production processor may be configured to incorporate production elements including a production algorithm specifying autonomous camera switching based on event activities that are informed by golf tracking data collected by the tracking system to produce programs. Computer generative commentary may also be generated by a commentary generator configured with a commentary generative model to generate commentary as described above. The model may utilize assets such as scoring data and other assets such as competition related information may also be used.

In various embodiments, the golf event production system is configured to generate broadcast programs for every shot live from each player. Media data collection network cameras and microphones may be positioned on each hole covering each location from tee to green, for the entire day. Each camera may be responsible for covering a single position on the course. And as the players make their way around the course, cameras are in position to capture each player taking their shots at every location. Media data collection network cameras may include a lockdown beauty camera capturing a view of clubhouse. In one embodiment, this beauty camera feed may be available prior to the first tee time, such as about 30 minutes before the first tee time, until the end of play each day. In various embodiments, on par 3 holes, a camera may be positioned to capture a point of view shot of the tee box, a camera may be positioned to capture the green, and an optional tee flanker camera may be used. On par 4 holes, a camera may be positioned to capture a point of view shot of the tee box, a camera may be positioned to capture fairway action, such as a handheld camera, a camera may be positioned to capture the green, and an optional tee flanker camera may be used. On par 5 holes, a camera may be positioned to capture a point of view shot of the tee box, a camera may be positioned to capture fairway action, such as a handheld camera, a camera may be positions to capture action on the fairway or green corresponding to a layup area, a camera may be positioned to capture the green, and an optional tee flanker camera may be used. Microphones may be located to capture sounds in the tee box of holes, with fairway cameras, which may be associated with boom mics, and around the green. The tracking system may include a tracking sensor network as described herein.

The production processor may be setup for a single production operator to follow a single group of players from their first hole or first shot, as the case may be, to their final hole or final shot of the day. Utilizing the production processor via the production elements switcher interface, production operators produce a unique program for each group on the course. Each program may include live scoring graphics and natural sound from the course.

In one embodiment, media data feeds from the cameras is streamed to an encoder and encoded and streamed to the production processor in the cloud. The unencoded media data feeds and an output of flow from the encoded media data feed streamed to the cloud are fed to media data quality analysis multi-viewers. Multi-viewers displaying the unencoded media data may be placed next to multi-viewers displaying the encoded media data to compare the camera signals from the course with the camera signals that are encoded and streamed to the cloud. Program outputs from the production processor may also be added to the multi-viewer for viewing. Alarms may be triggered if audio dropout, signal degradation or other discrepancies are present. Tracer graphic outputs may include an HTML display that is added to the encoded camera source prior to input into the production processor or by the production processor. In one example, the encoded media data provided to the multi-viewers includes layered tracer graphics. In another example, tracer graphics are not provided to the multi-viewers or are provided in an additional encoded media data feed.

The production processor is configured for video switching operations. The production processor may ingest all the camera sources. Each camera source may include an audio program including left/right natural sound and the video data from the course position. The camera sources may be grouped based on course holes. Each hole may be associated with a snapshot including the corresponding camera source groupings and production elements for that hole. The snapshots may be recalled by production operators or automatically be the production processor to key operations via the production processor switcher interface to the hole.

Golf tracking data collected by the tracking system may be ingested in real time by the production platform to provide live scoring graphics for each group. The production platform is configured to dynamically update graphics to include the names of the players in the group, their current scores, who is currently hitting next, and additional information. The production platform is further configured to dynamically update scoring graphics, such as live leaderboards. The production platform may also be configured to generate graphics comprising dynamic slates and tee times. In example, live scoring graphics may be generated by a graphics engine. In one example, live scoring may be provided in HTML. Shot metrics graphics may be generated from shot metrics data. In one example, shot metrics data is provided in HTML.

In the production processor switcher interface, camera source feeds may be grouped together with respect to location or other division, e.g., by holes, and each grouping may be associated with a pre-produced production algorithm of how the production operator should produce the action. Each camera source feed may include an audio mix for the course position covered so when the operator switches cameras, the audio will follow their selection. Additional production elements may also be including in the groupings include shot numbers, pre-produced videos and graphics, live scoring graphics, or combination thereof. The production algorithm defines how production operators are to cover each golf shot, what to play between shots, and what happens after the players finish a hole. For example, when players in a group finish a hole, production operators or the production processor may automatically recall the grouped production elements for the next hole setup which includes the corresponding grouped camera sources, production algorithm, and additional production elements. This process may be repeated for all of player groups as they make their way around the course. Thus, a production operator may follow a player through throughout their round till completion to produce a program via the production processor.

Group program may be produced with and without graphics. Programs with graphics may be streamed from the distribution platform or directly from the production processor to program recipients. Programs without graphics may similarly be streamed or archived. Program output may comprise a multichannel output including channel 1-2—mix, channel, 3-4—tee shot audio, channel 5-6—fairway audio, and 7-8—green audio. Options to receive program feeds may include direct feed from the production processor, e.g., via an entitlement SRT, ZIXI, or RTP. The distribution platform may receive such a direct feed via an entitlement. The distribution platform may distribute the programs to program recipients from the cloud. The programs may be transcoded and streamed. In one example the distribution platform transcodes the programs for streaming to output recipients, e.g., via an entitlement SRT, ZIXI, or RTP. Program recipients may receive program streams from the distribution platform via HLS.

Programs may be streamed to program recipients for the creation of a play by play feed. The play by play feed comprises clips of each shot and may further include golf tracking data applied. Over the course of four rounds of a tournament there are approximately 32,000 golf shots taken. The clips may be published immediately upon creation. Highlights may be created from each program. In one example, when a player finishes their round, a compilation of all of their golf shots from the day is created and published to a video management system, which may include the distribution platform, or program recipients.

In one embodiment, recordings of programs with and without graphics are archived. The recordings may be formatted, e.g., in XDCAM 50, 1080i 2997, 8 channels of audio. A timecode may be generated to match the stream where the play by play feed is created. Logs of the programs may also be created from the play by play videos that are published.

In one embodiment, autonomous commentary may be generated using a combination of golf tracking data collected by the tracking system, media guides, video, and other assets along with a large language model to provide viewers the option to turn on a commentary audio track in different languages and/or to offer coverage from different points of view, such as play analysis, color analysis, or statistical analysis. The process may include building on the ability to describe a single golf shot to expand to describing how a golfer is playing throughout their round. In addition to only using golf tracking data, the generative AI model may be configured to provide descriptive commentary of what the viewer is seeing, how the golfers are competing against the field, historical references, and other event, theme, or competition related information.

In one implementation media data captured by the media data collection network and golf tracking data collected by the tracking system may be used to automate the switching of cameras by the production processor to produce programs from the media data. For example, golf tracking data may include when a ball is hit, when it reaches the apex of flight, and when it lands and comes to rest. This data, along with the production algorithm, which may be with respect to each hole, may be used to automate creation of the programs, as described in more detail above.

In some embodiments, media data collection cameras may comprise remote controlled cameras operated by remotely located operators throughout play. Tracking system cameras, which may include multiple cameras located on each hole, collect scoring and positional data. In one embodiment, these cameras may also be used to follow players around the course from tee to green of each hole. In one example, live camera feeds may be provided by drones, mobile phones, or other cameras to provide additional coverage. In one example, additional coverage may be provided by user generated content comprising media data collected by spectator smart phones or other cameras. In an above or another embodiment, bonded cell technology is implemented to provide video coverage.

FIGS. 10-12D illustrate a system for consumption of live event broadcasts 80 and features thereof, wherein like numbers identify like features, according to various embodiments.

Figure 10:
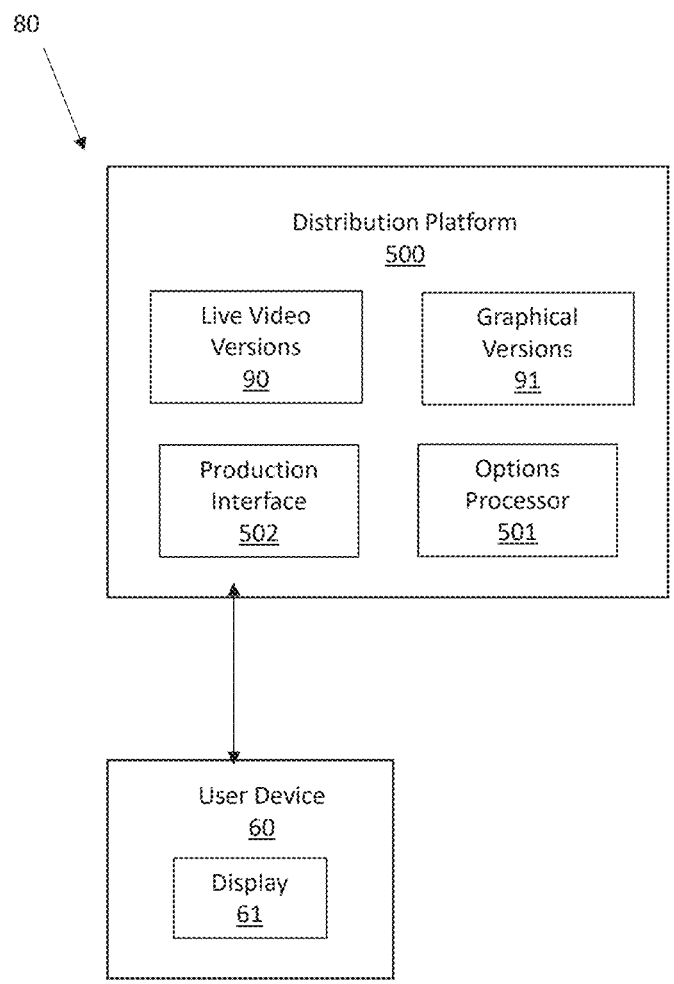
FIG. 10 is a schematic of a system for consumption of live event broadcasts according to various embodiments described herein.

With particular reference to FIG. 10, the system 80 includes a distribution platform 500 or data for such a platform 500 that enables display of media content comprising live video versions 90 and graphical versions 91 of the event or aspects thereof, simultaneously. The simultaneous display may present the versions in sync.

The distribution platform 500 may include a platform interface 502 accessible by a user device 60 configured for user interaction. Utilizing the platform interface 502, a user using the user device 60 may select media content for viewing. The media content includes media data including live event video and graphical depictions of a live event and related content that users may select for viewing via the platform interface 502. The distribution platform 500 may provide the media content to the user device 60 for display on a display 61 of the user device 60 or in communication therewith.

The user device 60 may include any suitable device for accessing the distribution platform 500 and viewing selected media data. For example, the user device 60 may comprise a computer, tablet, smart phone, smart television, projectors, interactive television device, augmented reality or virtual reality headsets, projectors, or other augmented or virtual reality device, or combination interface and display that interfaces a user with display elements.

The distribution platform 500 may include a processor and memory storing instructions that when executed by the processor perform the operations of the distribution platform 500. User devices 60 may utilize an application to one or more of access, view, or interact with the media content. The application may be stored, executed, or both, in whole or in part, on the user device 60, distribution platform 500, or both. In various embodiments, the distribution platform 500 comprises a website, webserver, web application, or combination thereof, including multiples, configured to distribute media content to client user devices 60. The web application may comprise a video streaming application. The distribution platform 500 may distribute live video versions 90 and graphical versions 91 in a manner as described above with respect to distribution platform 50. In one example, the distribution platform 500 comprises a website and webserver in communication with a media server that hosts the website and transmits media content to client user devices 60 utilizing a suitable transport protocol, such as SRT, RTP, RTSP, ZIXI, or combination thereof. In one example, the distribution platform 500 is cloud based. The distribution platform 500 may comprise a video encoder to encode or transcode media content. The distribution platform 500 may be configured for operation in unicast, multicast, or both environments. The distribution platform 500 may serve the media content utilizing internet protocol delivery methods such as Transmission Control Protocol (TCP), User Datagram Protocol (UDP), or combination thereof. The distribution platform 500 may include a mobile version that may be executed utilizing a mobile application or website optimized for mobile access. Media content may be streamed to user devices 60 and displayed on the user device 60 by a browser or other suitable application. In some embodiments, portions of media content or accessory features related to the media content or presentation thereof may be streamed for downloading by the user device 60. In one embodiment, media content may be embedded in websites for viewing.

A user device 60 may access the distribution platform 500 via the platform interface 502 to request media content comprising one or more live video versions 90 of the event, one or more graphical versions 91 of the event, or combination thereof. Requests sent from user devices for media content, live or graphical versions 91, display options, audio options, or other content or modifications thereof may be executed by the distribution platform 500, such as by an options processor 501, or transmitted by the options processor 501 for execution by another service and the requested media content or modification thereof is streamed to the user device 60 directly or from the distribution platform 500. Other services may include other media data distribution platforms, webapps, graphics engines, or other resource providing media content or modifications thereto.

Live video versions 90 may comprise video data of the event, which may be a broadcast or other video of the event. The event may be a live event. Event video may comprise live broadcast video, which may include programs such as those described produced by the production processor 41 (see, e.g., FIG. 1) or otherwise. For example, the golf event production system 10 described above may output programs to the system 80. For example, distribution platform 50 may output programs generated by the production platform 40 for viewer consumption with the system 80 utilizing the distribution platform 500 that provides the platform data to simultaneously display live video versions 90 as well graphical versions 91 including depictions or related graphics of the live event. The distribution platform 500 may provide the simultaneous display in an interactive format. For instance, a display may be provided with or in communication with a platform interface 502 that allows users to interact with the displayed media content. In one embodiment, distribution platform 50 comprises distribution platform 500. While the event is generally described herein as being live, the systems and methods described herein may be similarly applied to viewing replays of live events with graphical versions synced to a produced program of the event.

Graphical versions 91 may include graphical depictions of the event. For example, graphical versions 91 may include computer generated content, such as computer generated animation depicting the event. The content may be provided in 2D, 3D, augmented reality, or virtual reality, as examples. Graphical versions 91 may include graphics integrating text, such as stats related to the event. Graphical versions 91 may be generated by various methodologies, such as those employing computer animation, graphic engines, game engines, or other digital animation technologies. In one embodiment, video may be utilized in a video to animation process to generate a computer generated animation as part of a graphical version 91. In one example, live video from a corresponding live video version 90 may be used.

Graphical versions 91 and related graphical content may be generated by the distribution platform 500, graphical version resource, or combination thereof. In one embodiment, the distribution platform 500 requests graphical version media data selected by users from a graphical version resource. For example, the platform interface 502 may be associated with an application configured to transmit data requests to the graphical version resource. In one example, requested graphical versions 91 are transmitted directly to the user device. In another example, requested graphical versions 91 are streamed to the distribution platform 500 and then streamed to the user device. In another example, the requested graphical versions 91 are streamed or streamed to the distribution platform 500 and streamed for viewing on the user device 60 utilizing the distribution platform 500 application.

Options may be provided by an options menu 510 that includes display options 516. Display options 516 may include event navigation. Event navigation may be location specific, participant specific, view specific, event information specific, or otherwise. In some embodiments, the options menu 510 provides audio options 518 such as sound track or commentary related options.

The platform interface 502 may include a program menu 504 that a user may interact with to make version selections for viewing. A user device 60 may access the distribution platform 500 via the platform interface 502 to request media content comprising one or more live video versions 90 of an event via a live video version selections 512 interface, one or more graphical versions 91 of the event via a graphical versions selections 514 interface, or combination thereof.

Requests sent from user devices 60 for media content or options implementation may be executed by the distribution platform 500 or transmitted for execution by another service for streaming to the user device 60.

Figure 12A:
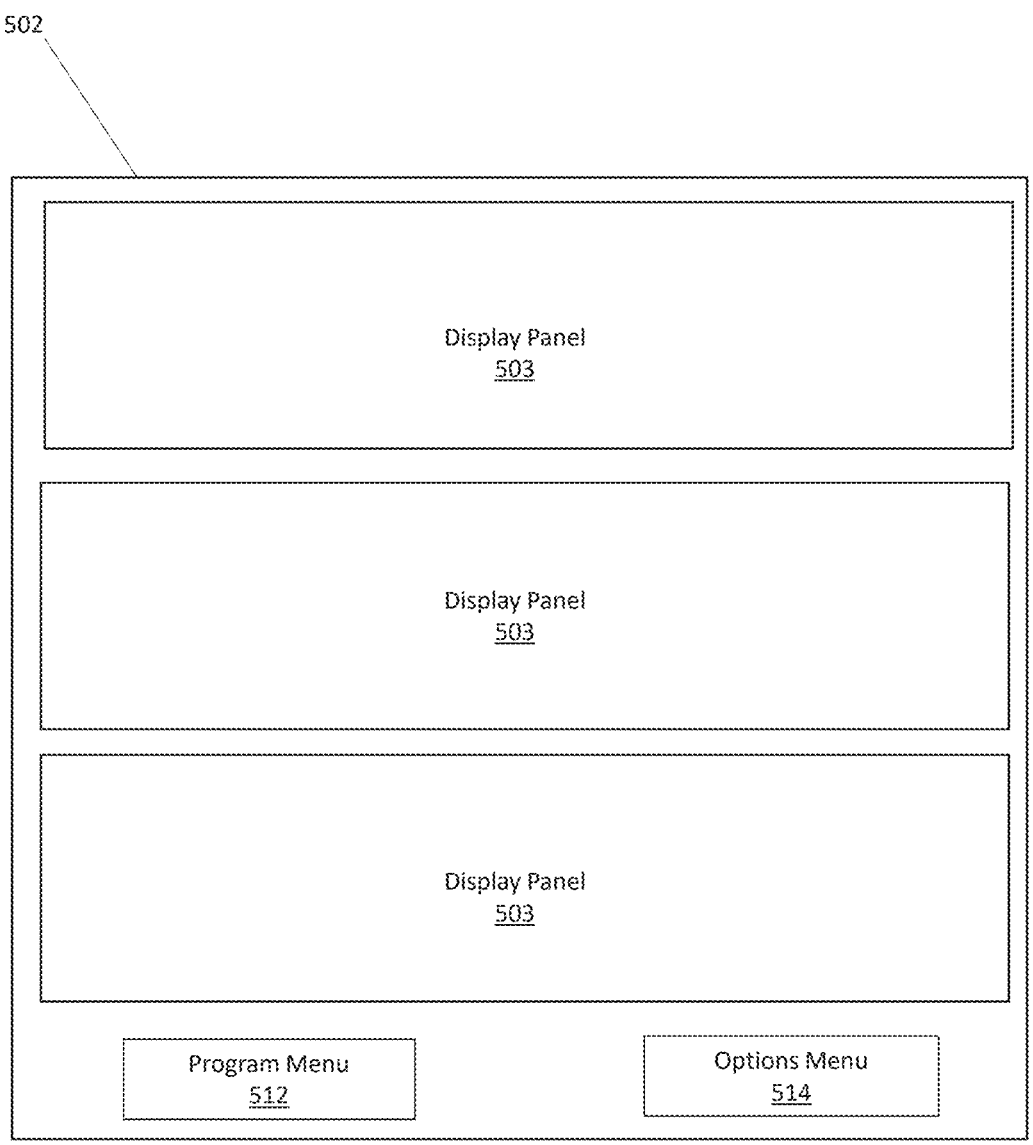
FIGS. 12A-12D illustrate user display layout options provided by a interface of a distribution platform of a system for consumption of live event broadcasts according to various embodiments described herein.

In various embodiments, the platform interface 502 may provide users with display layout options for customized viewing. FIGS. 12A-12D illustrate example display layouts that may be provided. For instance, the platform interface 502 may enable a user to select display panel size, location, or both for one or more selected live video versions 90, graphical versions 91, or both. In FIG. 12A, the page layout includes three display panels 503. A user may select to display three live video versions 90, three graphical versions 91, two live video versions 90 and a graphical version 91, or two graphical versions 91 and a live version 90 for display in the display panels 503. As described in more detail below, some embodiments may enable a user to define a dynamic display wherein the version displayed in a particular display panel 503 changes based on a timed sequence, event activities, or other criteria. Options may be provided in the viewer display for modification of the viewing experience during the event. For example, a program menu 512, options menu 514, or both may be provided for interaction with the user.

Figure 11:
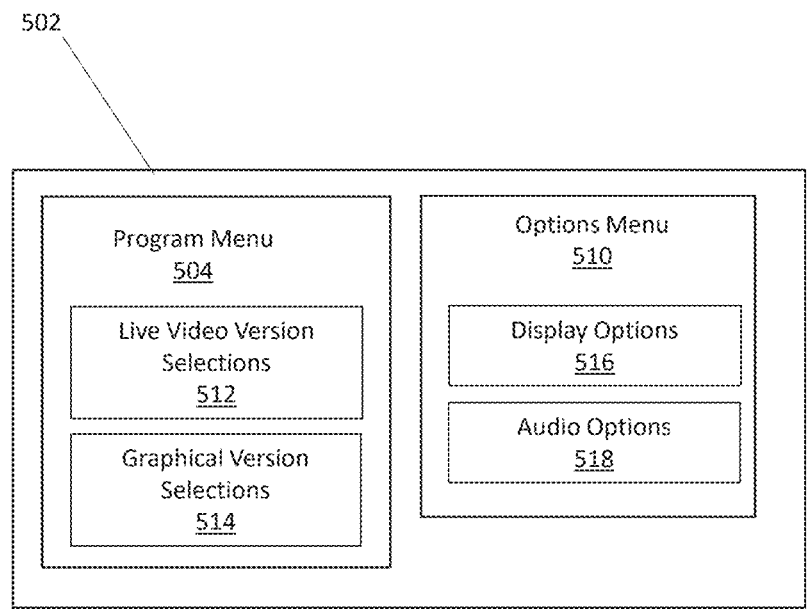
FIG. 11 depicts viewing options provided by a interface of a distribution platform of a system for consumption of live event broadcasts according to various embodiments described herein.
Figure 12B:
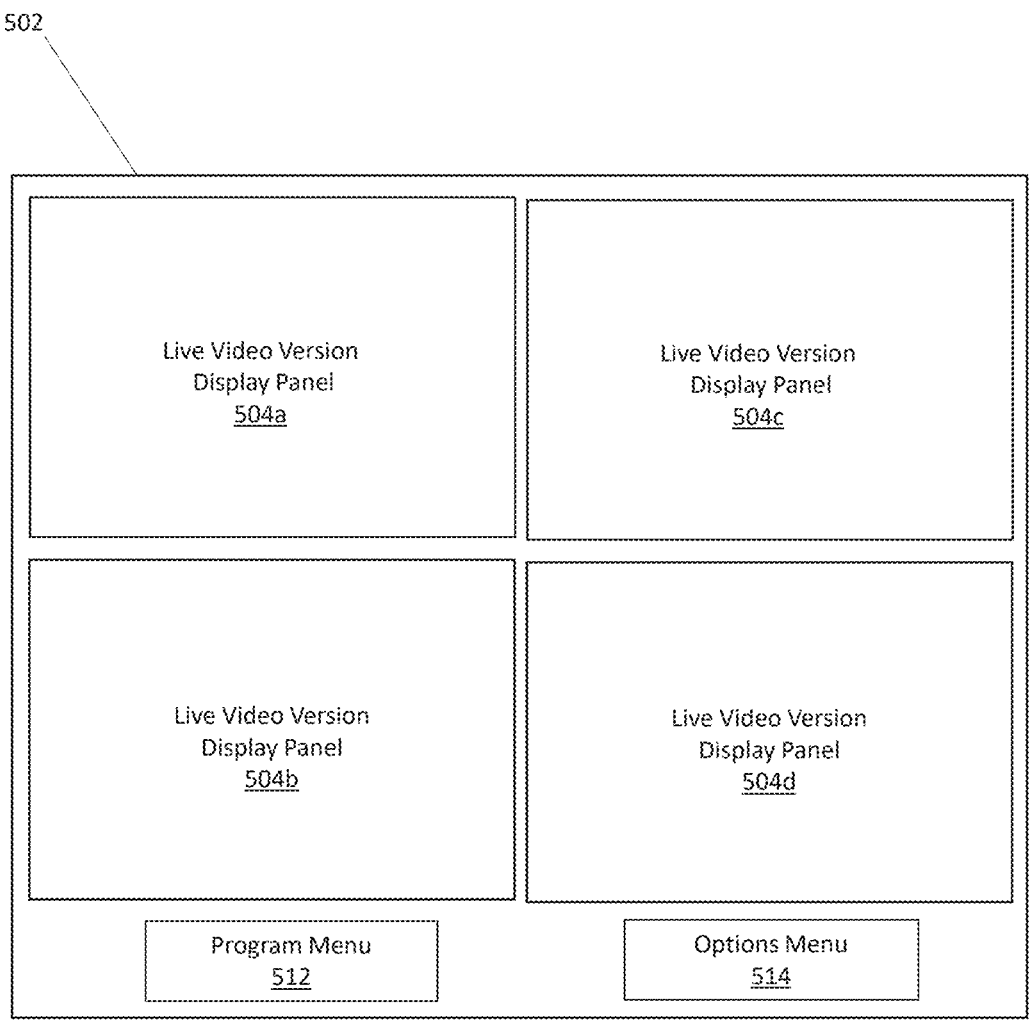

In one embodiment, with reference to FIG. 12B, the platform interface 502 provides options to view a plurality of different live versions 90 at once using the live video version selections 512 interface (FIG. 11). For example, a user may select multiple live video versions 90 of the event captured from different perspectives, locations, featuring different participants, or sound or video variations. For instance, a user may select one or more programs corresponding to a player, multiple players, a player group, or player groups. The distribution platform 500 may enable a user to view the selected live video versions 90 in split screen, in multiple display panels 503, in a timed sequence, or based on event activities in the live video versions 90. In the illustrated embodiment, the platform interface 502 includes four live video version display panels 504a-504d for viewing four live video versions 90 at once. As described above, live video versions 90 may comprise programs including video and audio. In some embodiments, the programs may include overlaid graphics, as also described above. In one example, a user may be provided with an option to select a program without the program graphics or toggle graphics on and off. A program menu 512, options menu 514, or both may be provided onscreen for options selection during the event presentations.

Figure 12C:
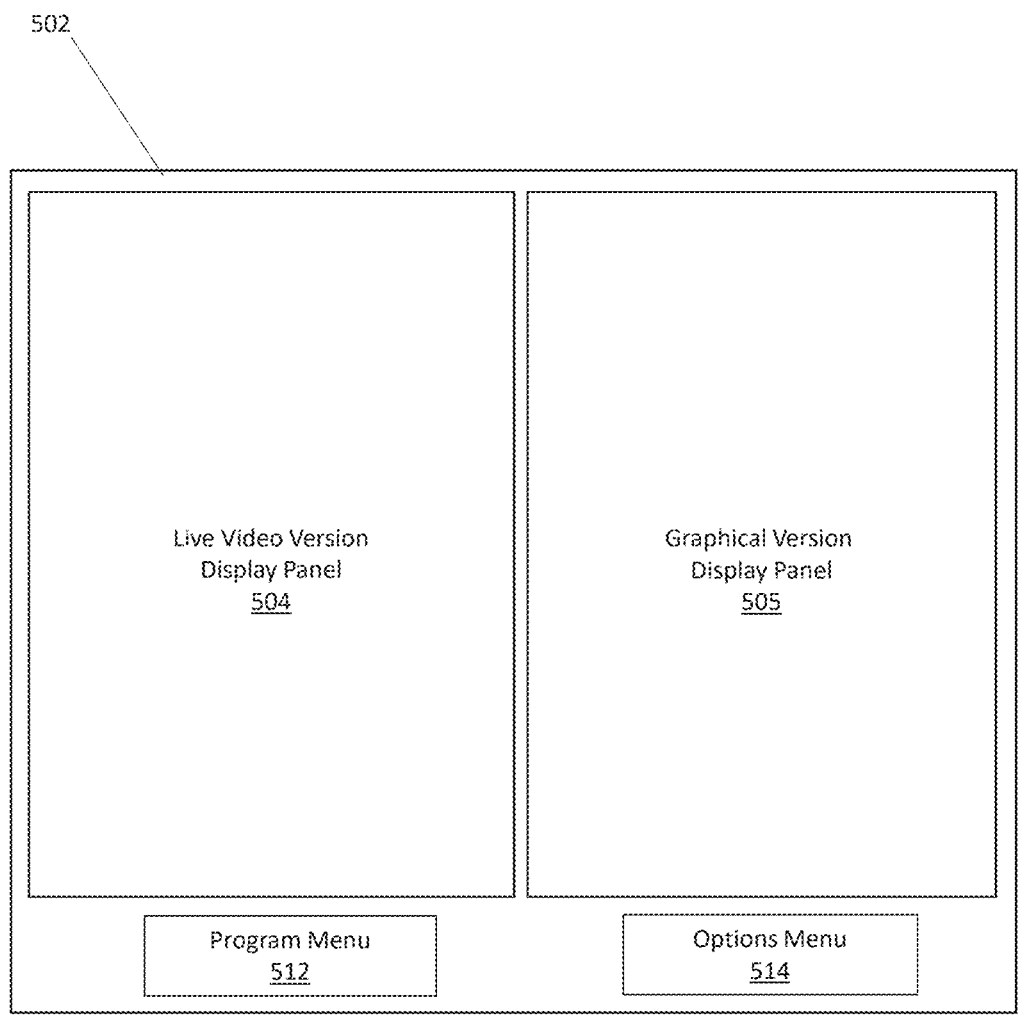

The platform interface 502 may be configured to allow users to view both live event versions and graphical versions in the same display. The platform interface 502 display illustrated in FIG. 12C depicts a split screen arrangement wherein a live video version display panel 504 is provided next to a graphical version display panel 505. A program menu 512, options menu 514, or both may be provided onscreen for options selection during the event presentations.

In some embodiments, the platform interface 502 provides options to view one or more graphical versions 91 using the graphical versions selections 514 interface (FIG. 11). In one configuration, a user may select a plurality of different graphical versions 91 to view at once. For example, a user may select graphical versions 91 of the event depicted from different perspectives, locations, featuring different players or player groups, or sound or video variations. The distribution platform 500 may enable a user to view the selected graphical versions 91 in split screen, in multiple panels, in a timed sequence, or based on characteristics of the event activities, such as in the live version.

In some embodiments, the platform may enable a user to select display panel size, location, or both for one or more selected live versions, graphical versions 91, or both.

Figure 12D:
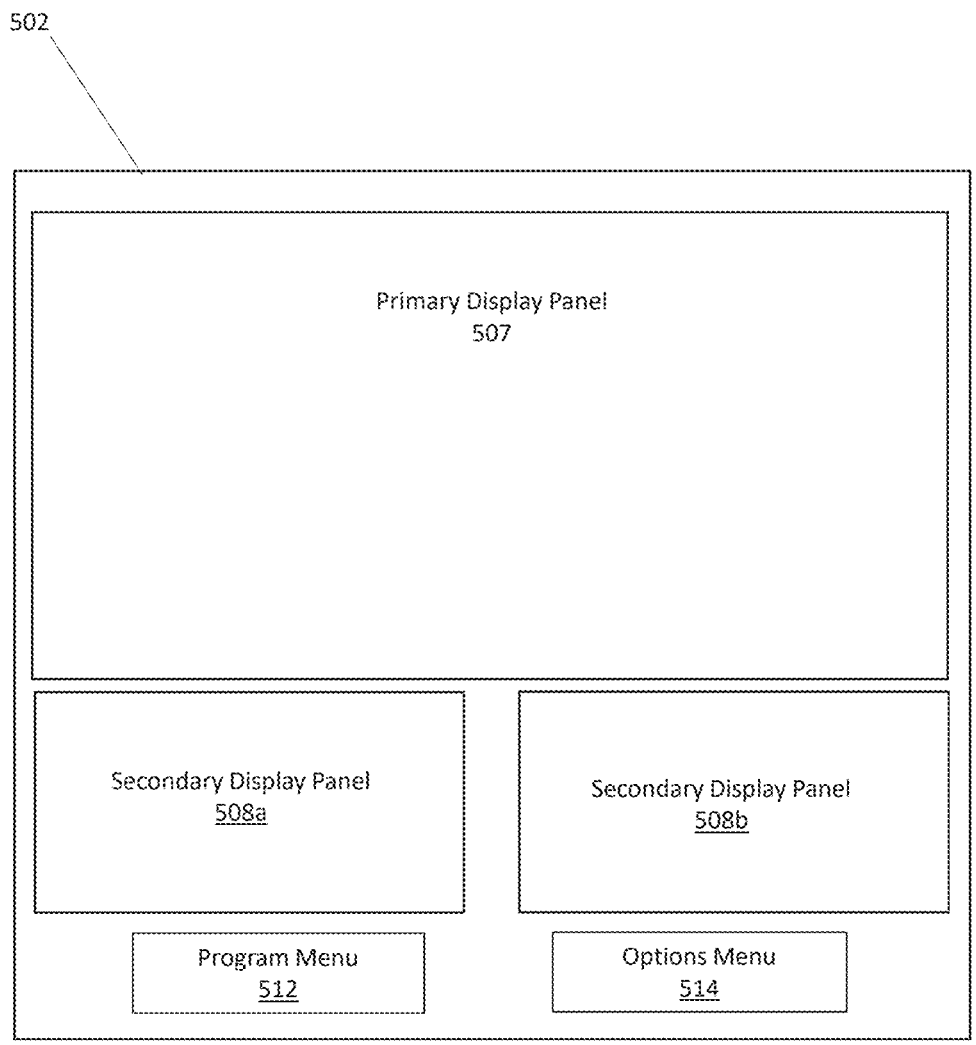

With further reference to FIG. 12D, the platform interface 502 may enable a user to select display panel size, location, or both for one or more selected live video versions 90, graphical versions 91, or both. In one example, the user may select to have a primary display panel 507 that is larger than other display panels, located in a different area of the display, or both. In a further example, the user may select to have one or more secondary display panels 508a, 508b. The primary display panel 507 and secondary display panel 508a, 508b may display graphical versions 91 or live video versions 90. For instance, a user may select to display three live video versions 90, three graphical versions 91, two live video versions 90 and a graphical version 91, or two graphical versions 91 and a live version 90 for display in the display panels 507, 508a, 508b. In one example, a user may select which versions are displayed in which display panels. In a further example, versions displayed in the display panels may be variable, e.g., dynamically based on event activities defined by the user. In one embodiment, multiple primary display panels 507 may be provided in a display along with one or more secondary display panels 508a, 508b. In a further example, using display options 516 in the options menu 510, the user may select event activities that direct the distribution platform 500 as to what graphical version 91 should be included in a primary display panel 507. Thus, the primary display panel 507 may change based on selected event activities. In one configuration, a primary display panel 507 includes a live video version 90 and a graphical version 91 of the live video version 90 or graphics related to the particular live video version 90.

Further to the above, the platform interface 502 may provide users with selectable display options 516, such as viewing multiple live video versions 90 in split screen panels, specifying panel locations, toggle viewing allowing the user to toggle between live video versions 90 for current display, location, or panel size. For instance, a user may select groups of golfers to follow, wherein the live video version 90 of each player group comprises the corresponding program. The user may select to view each player group simultaneously in separate display panels. In one example, the user may select to have a primary display panel 507 larger than other secondary display panels 508a, 508b, located in a different area of the display. In another example, a primary display panel 507 displays a currently displayed version while additional selected versions are not displayed.

Display options 516 may be provided for dynamic display of selected versions in a timed sequence or according to event activities. For example, the user may select event activities that direct the distribution platform 500 as to what live video version 90, graphic version 91, or both should be displayed, which may include which version shall be presented in a primary display panel 507, secondary display panel 508a, 508b, or where to display selected versions at particular times corresponding to event activities. Thus, the displayed versions, their location, and the layout may change based on user selected event activities via display layout options. For instance, selectable display options 516 with respect to event activities may include a particular player, shot type, stroke type, location, hole, or leaderboard position, as examples. A user may specify that when a particular player is taking a shot, the live video version 90, graphical version 91, or both capturing that shot should be displayed. Location or particular display panel for the display may be specified in some configurations. When a primary display panel 507 is included, the user may specify which version is to be displayed in the primary display panel 507. Similarly, a user may select for display of shots or shot types such as putts, drives, or approach shots. For example, the user may specify that all putts or putts by particular players in selected versions or all putts or putts by particular players of 10 feet or more from the hole should be displayed or displayed in a particular primary or secondary display panel 507, 508a, 508b or within a particular panel location. As another example, a user may define display layouts for selected versions with respect to activities taking place at a particular location, such as all shots or types of shots on particular holes, e.g., bunker shots on holes 8 and 9. In one embodiment, the platform interface 502 may enable the user to define a preference ranking with respect to display options 516 selections that directs the distribution platform 500 as to which versions, display locations, or other display option take priority when multiple selected event activities are taking place in the live action. In one embodiment, one-click promotion may be provided wherein selecting a particular display panel promotes or demotes the version being played to another display panel or either enlarges or reduces the size of the display panel.

Graphical versions 91 may include course graphics in a computer graphics format. Graphical versions 91 may incorporate dynamic shot trails, radar data, green view, highlights, different viewing perspectives, player or player group specific statistical data, event statistics, or other statistics or standings related to the event, tour, or professional golf. For example, graphical versions 91 may incorporate golf tracking data collected on the course, e.g., by the tracking system 30 (FIG. 1). The golf tracking data may be provided in numerical format, such as swing speed, attack angle, launch angle, direction, ball speed, spin, smash factor, apex, carry distance, roll distance, total distance, roll distance, distance from the pin, or other tracking system data. Additionally or alternatively, various golf tracking data may be integrated in an animated display of the live action within a graphical version 91. For example, a computer generated animation of a shot may accurately reflect the ball flight golf tracking data within a graphical depiction of the shot on the course. The graphical version 91 may incorporate visualizations of shot shapes, shot traces, or the like. The graphical version 91 may depict players and course features.

In various embodiments, the platform interface 502 is configured to provide event navigation aspects. In one embodiment, the platform interface 502 may enable the user to select a perspective of the graphical version 91, such as fan perspective, player perspective, overhead, green, tee box, fairway, landing zone, or other perspective. In one example, perspective selection may be provided via interaction with graphical version selections 514 or display options 513. For example, a user may select player perspective graphical display to view a graphical depiction of the view of the course from the perspective of a player hitting a shot in the live version. Selections may be static or dynamic. For instance, a user may be able to define different graphical version 91 that are to be displayed relative to different players, particular event activities, particular holes or locations, or otherwise. In one embodiment, utilizing the platform interface 502, a user may manipulate a graphical version 91 to navigate around the course, zoom into or out of views, or change perspective, such as to player perspective or fan perspective on the fly. The distribution platform 500 may be configured to enable user manipulation of graphical versions 91 via a touchscreen interface, on screen controls, or both that enable users to use fingers or controls to fly around the course or change the angle and zoom into player or other perspective of the action.

Further to the above, the platform interface 502 may provide users with selectable display layout options, such as viewing multiple live versions in split screen panels, specifying panel locations, toggle viewing allowing the user to toggle between live versions for current display, location, or panel size. For instance, a user may select groups of golfers to follow, wherein the live video version 90 of each player group comprises the corresponding program. The user may select to view each player group simultaneously in separate display panels. In one example, the user may select to have a primary display in a panel that is larger than other panels, located in a different area of the display. In another example, a primary panel displays a currently displayed version while additional selected versions are not displayed. Display layout options may be provided for display of selected versions in a timed sequence or according to event activities. For example, the user may select event activities that direct the distribution platform 500 as to what live video version 90, graphical version 91, or both should be displayed, which may include which version shall be presented in the primary display or where to display selected versions at particular times corresponding to event activities. Thus, the displayed versions, their location, and the layout may change based on user selected event activities via display layout options. For instance, selectable display layout options with respect to event activities may include a particular player, shot type, stroke type, location, hole, or leaderboard position, as examples. For instance, a user may specify that when a particular player is taking a shot, the live video version 90, graphical version 91, or both capturing that shot should be displayed as a primary display or within a particular panel or panel location. Similarly, a user may select for display of shots or shot types such as putts, drives, or approach shots. For example, the user may specify that all putts or putts by particular players in selected versions or all putts or putts by particular players of 10 feet or more from the hole should be displayed as a primary display or within a particular panel or panel location. As another example, a user may define display layouts for selected versions with respect to activities taking place at a particular location, such as all shots or types of shots on particular holes, e.g., bunker shots on holes 8 and 9. In one embodiment, the platform interface 502 may enable the user to define a preference ranking with respect to display option selections that directs the distribution platform 500 as to which versions, display locations, or other display option takes priority when multiple selected event activities are taking place in the live action. Touch screen interface, on screen controls, or both may also be available for program selection, display options, or to otherwise manipulate live version display.

In some embodiments, graphical versions 91 include an interactive green view. Accessing green view via the platform interface 502, users may change view magnification to zoom into the green. The green view may include green undulation, green slopes, or other graphics. In one example, users may interface with the green view to measure the undulation and slopes relative to a ball location of a player in a live video version 90 prior to or after the player attempts the putt. In a further example, the user may interact with the green view to predict a successful putting line the player should take to hole a shot from the ball location or request the same from the platform interface 502.

In one configuration, a user may be able to key aspects of the graphical version 91 to the live video version 90, which may include characteristics or event activities in the live video version 90. For example, when a player or player group that is the subject of a selected live video version 90 is in the tee box of a hole, the graphical version 91 may display a flyover of the hole, overhead view of the hole, player or player group statistics related to the hole or their tee shots, preferred or strategic landing zones, tee shot landing locations of the player or other players competing in the event, a player perspective view from the tee box, or combination thereof. As another example, when a player or player group that is the subject of a selected live video version 90 is hitting an approach shot, the graphical version 91 may provide approach related statistics or graphics with respect to the player or other competing players, approach strategies, green undulation, green slope locations, a player perspective view corresponding to the location the player is hitting the ball, or combination thereof. As still another example, when a player or player group that is the subject of a selected live video version 90 is on the green, the graphical version 91 may provide putting related statistics or graphics with respect to the player or other competing players, putting strategies, green undulation, green slope locations, stimp rating of the green, a player perspective view corresponding to the location the player is putting the ball, or combination thereof. In one example, the graphical version 91 may incorporate club identification, identify equipment or clothing products or brands used or worn by the player. In one example, the graphical version 91 includes probabilities of the occurrence of outcomes related to the shot or competition, such a probability of making the shot, par, cut, or placement in the field. In this or another example, dynamic betting odds related to the shot or its impact on the competition may be included. In one implementation, keying aspects between versions may be available to be defined by the user. For example, one or more of the above options may be selected prior to or during the occurrence of the live event action by the user to define the experience or may be programed in the distribution platform 500. Graphical versions 91, which may include selectable aspects of graphical versions 91, may include on-course weather related data such as wind speed, precipitation, pressure, or humidity, as examples.

In some embodiments, the platform interface 502 interfaces users with audio options 518 to enable a user to customize audio. The audio options 518 may include commentary options, which may include those described above with respect to audio for programs produced by the production processor. For example, options to include or exclude natural sound audio, include or exclude commentary, or both may be available for selection. In some embodiments, audio options 518 may include commentary provided by humans, computer generated, or both. Commentary tracks in different languages may be available for selection to enable a user to select a preferred language in which audio is provided. In one embodiment, text commentary may be available in selectable languages. In a further embodiment, selection of a text language or commentary language selects the same for the other. In another embodiment, different languages may be selected for text and audio. In one embodiment, commentary point of view options may be available for selection such as color analysis, play analysis, statistical analysis, player focus, or the like. In one example, a commentary point of view may include stroke analysis that provides analysis of player swings during live play, commentary with a historical angle that incorporates historical discussions of the course, tournament, play, or player comparisons, rule analysis that provides a focus on rule impacting play and decision making on the course, or betting. In some embodiments, a user may select multiple points of view that the commentary generation module used to generate a commentary track that corresponds to the selected points of view.

The commentary may incorporate graphic versions that the user may select. For example, graphics of course hazards, terrain, putting surfaces, and the like may be displayed in conjunction with strategy commentary relating to the graphics. Graphical versions 91 may also be accompanied by commentary tracks that synch with the graphics to describe elements or other details with respect to the graphics. In one embodiment, audio options 518 may be available for dynamic toggling during viewing. For example, a user may select to have one commentary interrupt another commentary, which may be situationally defined by the user or in response to the user selecting a display panel or associated interface to turn commentary on or off with respect to a version presented in the display panel. In this or another example, audio options 518 may include commentary options wherein a user may turn commentary on and off, switch languages, or change points of view during the live viewing experiences. In one example, commentary options may include voicing options.

In some embodiments, one or both of a live graphical version 91 or graphical version 91 include replay of highlights. For example, a graphical version 91 may display highlights, which may incorporate additional graphics, such as tracking system data, statistics, scores, leaderboards, or other information. In a further embodiment, a user may be provided options with respect to which types of golf data the platform should incorporate into graphical versions 91, which may include highlights, to allow the user to further customize the viewing experience. In one embodiment, the platform interface 502 may allow a user to select various shots from one or more versions. The platform 502 or other service, such as production processor 41, may then generate a highlight program including the selected shots for output to the user. In one example, the highlights may be saved to an account of the user to enable the user to view the highlights in the future.

In one example, the system 80 is configured to enable displays a live golf broadcast and data feeds corresponding to a broadcasted golf event. The system 80 may provide media and related platform data for display of both the live video version 90 and a graphical version 91, such as that provided by TOURCAST™ and driven by SHOTLINK™, side-by-side, in sync, giving the viewer the ability to interact with the graphical display and stats via the platform interface 502 while watching the live video version 90. As described above and elsewhere herein, the platform interface 502 may provide the user options for program streams distributed by the distribution platform 500 to view. The platform interface 502 may incorporate the TOURCAST™ application or operations thereof and the user may interact with the application alongside the display of the media data. In one embodiment, the platform interface 502 provides a user an option of selecting up to four live video version 90 streams at once to view or select a single screen while displaying the TOURCAST™ application providing video versions alongside of it for further interaction. These live video versions 90 may be presented in panels as described above or elsewhere herein, such as with respect to FIG. 12B and FIG. 12D, or alongside one or more graphical versions 91 as described above or elsewhere herein, such as with respect to FIG. 12C and FIG. 12D.

With respect to media data streams, programs, live video versions, graphical versions described herein as being live. Those having skill in the art will appreciate that live, for instance live broadcasts, are generally subject to transmission delays, processing delays, or other delays. Thus, live is intended to include near real-time that accounts for such delays.

The systems, e.g., platform, modules, units, and components thereof, and methods described herein may find use in applications beyond golf. For example, the systems and methods may be used to enable production and distribution of media data from other types of sport events. The systems and methods disclosed herein may include still further functionalities and features. For example, the operative functions of the systems and methods may be configured to execute on a special-purpose processor specifically configured to carry out the operations provided by the systems and methods. Notably, the operative features and functionality provided by the systems and methods may increase the efficiency of computing devices that are being utilized to facilitate the functionality provided by the systems and the various methods disclosed herein. For example, a reduced amount of computer operations may need to be performed by the devices and components of the systems using the processors and memories of the systems than compared to traditional methodologies. In such a context, less processing power needs to be utilized because the processors and memories do not need to be dedicated for processing. As a result, there are substantial savings in the usage of computer resources by utilizing the software, techniques, protocols, and algorithms provided in the present disclosure. In certain embodiments, various operative functionality of the systems may be configured to execute on one or more graphics processors and/or application specific integrated processors. In some embodiments, various functions and features of the systems and methods may operate without any human intervention and may be conducted entirely by computing devices. In certain embodiments, for example, numerous computing devices may interact with devices of the systems to provide the functionality supported by the systems. Additionally, in certain embodiments, the computing devices of the systems may operate continuously and without human intervention to reduce the possibility of errors being introduced into the systems.

Figure 13:
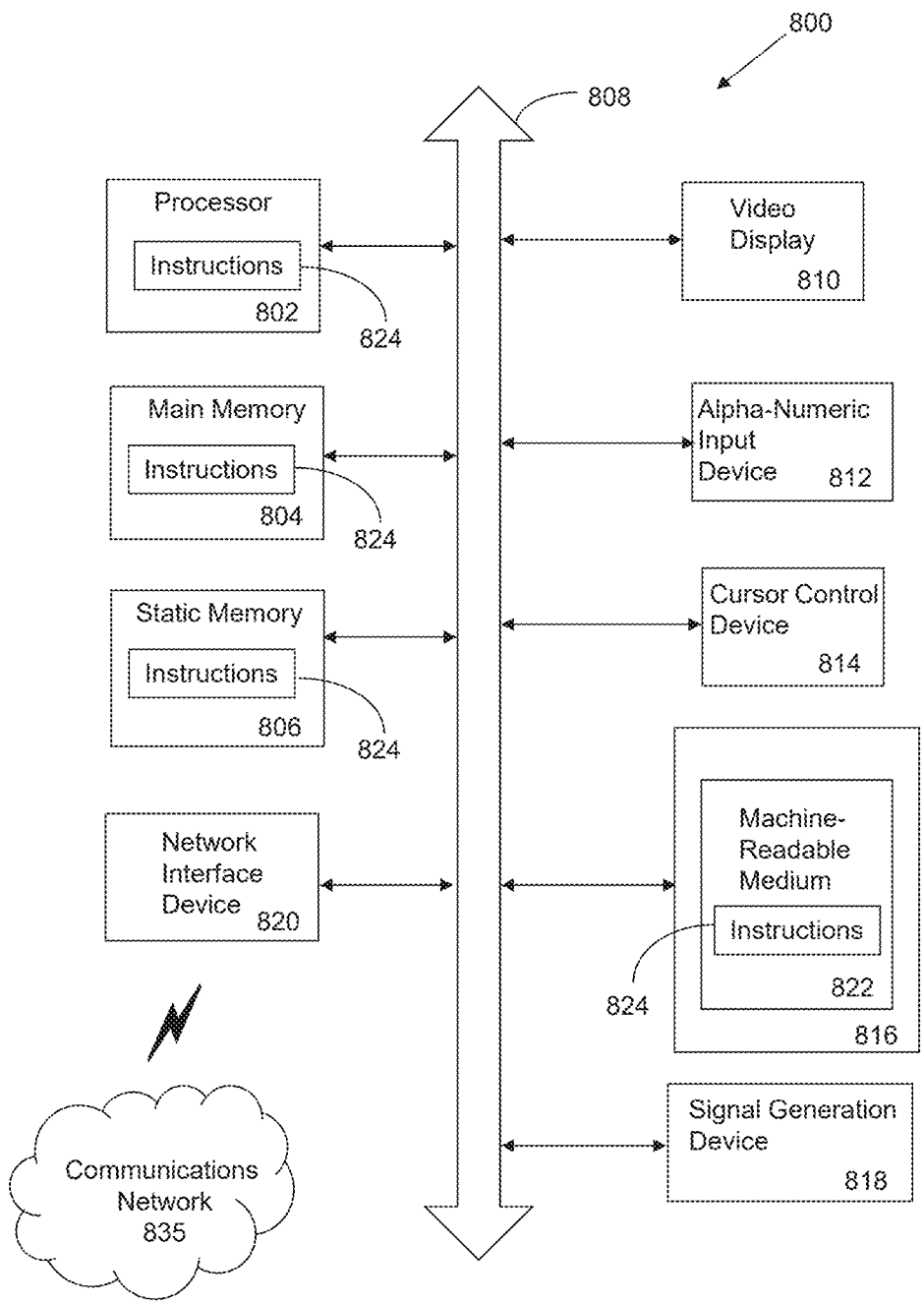
FIG. 13 is a schematic of a machine in the form of a computer system within which a set of instructions, when executed, may cause the machine to enable event broadcast production and distribution according to various embodiments described herein.

Referring now also to FIG. 13, at least a portion of the methodologies and techniques described with respect to the exemplary embodiments of the system (e.g., golf event production system 10, system 80) can incorporate a machine, such as, but not limited to, computer system 800, or other computing device within which a set of instructions, when executed, may cause the machine to perform any one or more of the methodologies or functions discussed above. The machine may be configured to facilitate various operations conducted by the system. For example, the machine may be configured to, but is not limited to, assist the system by providing processing power to assist with processing loads experienced in the system, by providing storage capacity for storing instructions or data traversing the system, or by assisting with any other operations conducted by or within the system. As another example, the computer system 800 may assist with obtaining event-related data, data transmission, modification of event-related data, data importation, data storage, data processing, data translation, data mapping, updates to any thereof, or a combination thereof, present in an environment being monitored by the system. As another example, the computer system 800 may assist with output, distribution, or both of updates or assembling or compiling modified event or other data for delivery or distribution to clients, for television broadcast, streaming broadcasts, onsite display, offsite display, digital platforms for viewing, manipulating, formatting, or combination thereof of the same.

In some embodiments, the machine may operate as a standalone device. In some embodiments, the machine may be connected to and assist with operations performed by other machines and systems, such as, but not limited to, any functionality, generator, simulator, database, engine, of other functionality described herein, any of which may be provided by such other machines or systems to the machine for use by system in performance of the operations described herein. The machine may be connected with any component in the system. In a networked deployment, the machine may operate in the capacity of a server or a client user machine in a server-client user network environment, or as a peer machine in a peer-to-peer (or distributed) network environment. The machine may operate in a cloud environment in which resources are distributed. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 800 may include a processor 802 (e.g., a central processing unit (CPU), a graphics processing unit (GPU, or both), a main memory 804 and a static memory 806, which communicate with each other via a bus 808. The computer system 800 may further include a video display unit 810, which may be, but is not limited to, a liquid crystal display (LCD), a flat panel, a solid state display, or a cathode ray tube (CRT). The computer system 800 may include an input device 812, such as, but not limited to, a keyboard, a cursor control device 814, such as, but not limited to, a mouse, a disk drive unit 816, a signal generation device 818, such as, but not limited to, a speaker or remote control, and a network interface device 820. The network interface device 835 may handle data communications for other devices, modules, units, or components of the system or another system or machine.

The disk drive unit 816 may include a machine-readable medium 822 on which is stored one or more sets of instructions 824, such as, but not limited to, software embodying any one or more of the methodologies or functions described herein, including those methods illustrated above. The instructions 824 may also reside, completely or at least partially, within the main memory 804, the static memory 806, or within the processor 802, or a combination thereof, during execution thereof by the computer system 800. The main memory 804 and the processor 802 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine-readable medium 822 containing instructions 824 so that a device connected to the communications network 835, another network, or a combination thereof, can send or receive voice, video or data, and communicate over the communications network 835, another network, or a combination thereof, using the instructions. The instructions 824 may further be transmitted or received over the communications network 835, another network, or a combination thereof, via the network interface device 820.

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device," or "computer-readable device" shall accordingly be taken to include, but not be limited to: memory devices, solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

What is claimed is:

1. A production system configured to produce live programs of players or groups competing in a golf event comprising one or more rounds of a golf tournament, the system comprising:
    a production processor configured to receive feeds of media data captured by a media data collection network comprising a plurality of cameras and microphones positioned around a golf course to collect media data of the golf event, the production processor operable to perform switching operations between camera sources according to a production algorithm utilizing golf tracking data collected by a tracking system comprising a sensor network positioned around the golf course during the golf event to produce live programs of players or player groups competing in the golf event,
    wherein each camera source corresponds to a course position and includes the media data captured by one of the cameras and, optionally, one or more microphones associated with the course position, and
    wherein the production processor is configured to stream the programs to a distribution platform that comprises or that is configured to distribute the programs to a system for consumption of live event broadcasts, and wherein the system for consumption of live event broadcasts is configured to enable simultaneous display of media content comprising the programs and one or more graphical versions depicting the golf tournament simultaneously, in sync, in a user interactive display format.

2. The system of claim 1, wherein the production processor is configured to stream the programs directly to the distribution platform over an open internet connection.

3. The system of claim 1, wherein the production processor includes a production elements switcher interface configured to interface a production operator with switching operations of the production processor, wherein the production processor is configured to receive production elements comprising the production algorithm and graphics for program production, and wherein the production processor is configured to incorporate the production elements into the production elements switcher interface such that switching operations directed by the production elements switcher interface are linked to the production elements specified by the production algorithm.

4. The system of claim 3, wherein the graphics comprise live graphics and the production processor is configured to dynamically update the live graphics with the golf tracking data or receive the dynamically updated live graphics from a graphics engine and integrate the updated live graphics into the switching operations directed production elements switcher interface for real time use of the updated live graphics according to the production algorithm.

5. The system of claim 3, wherein the production elements are grouped by holes, and the production processor is configured to incorporate the production elements for each hole into switching operations directed by the production elements switcher interface when recalled by the production processor or a production operator.

6. The system of claim 1, wherein the production processor is configured for autonomous switching driven by event activities of the golf event, wherein the production processor is configured to identify camera sources and perform the autonomous switching according to the production algorithm to assemble programs of each shot of a player or group of players throughout a round, and wherein at least one of (1) the tracking system tracks event activities and generates a signal upon the occurrence of an event activity and (a) the production processor is configured to listen for signals corresponding to event activities that trigger switching operations specified by the production algorithm or (b) occurrences of event activities are transmitted to the production processor, or (2) the production processor is configured to monitor the golf tracking data collected by the tracking system for event activities that trigger switching operations specified by the production algorithm.

7. The system of claim 6, wherein the tracking system, production processor, or combination thereof is configured with computer vision to identify players, balls, or both in video data captured on the course that is used by the production processor to drive autonomous switching operations and is preloaded with field of views of the media data collection network cameras and is configured to utilize player location, ball location data, or other event activity location to identify the camera sources capturing event activities based on the field of view and tracked location data.

8. The system of claim 7, wherein the tracking system is configured for autonomous collection of golf tracking data and utilizes computer vision to identify and track players and radar devices to detect balls in flight, swings, or both.

9. The system of claim 8, wherein the tracking system, production processor, or combination thereof is configured to employ player recognition, playing order, location of a player relative to a ball at a resting position of a previous shot by the player, location of a player relative to a ball when detected to be swinging, or combination thereof to associate players to the balls of the players.

10. The system of claim 7, wherein the production processor uses time and hole location of the occurrence of the event activity to identify the camera source capturing the event activity and trigger switching to the camera source.

11. The system of claim 1, wherein the production platform further comprises a commentary generator configured for autonomous generation of program commentary, and wherein the commentary generator utilizes golf tracking data, video, a large language model and one or more assets selected from competition related data, theme related data, or combination thereof to generate the commentary.

12. The system of claim 11, wherein the commentary generator is configured to generate program commentary in different points of view comprising two or more of color analysis, play analysis, or statistical analysis.

13. The system of claim 12, wherein the presentation platform is configured to receive feeds of live media data captured by spectators for use by the production processor to produce programs.

14. A method of producing live programs of golf events, the method comprising:
receiving media data of a golf event captured by a media data collection network comprising a plurality of cameras and microphones positioned around a golf course the golf event is played to collect the media data of the golf event, the golf event comprising one or more rounds of a golf tournament;
receiving golf tracking data of the golf event collected by a tracking system comprising a sensor network configured to collect the golf tracking data during play of the golf event;
receiving feeds of the media data at a production processor; and
performing, with the production processor, switching operations between camera sources according to a production algorithm to produce live programs of players or player groups competing in the golf tournament, wherein each camera source corresponds to one of the feeds of the media data collected at a course position by one of the cameras and, optionally, one or more of the microphones, wherein the production processor is configured to stream the programs to a distribution platform that comprises or that is configured to distribute the programs to a system for consumption of live event broadcasts, and wherein the system for consumption of live event broadcasts is configured to enable simultaneous display of media content comprising the programs and one or more graphical versions depicting the golf tournament simultaneously, in sync, in a user interactive display format.

15. The method of claim 14, wherein the programs are streamed directly to the distribution platform over an open internet connection, and wherein the production processor and distribution platform operate in a cloud computing environment.

16. The method of claim 14, wherein the production processor includes a production elements switcher interface configured to interface a production operator with switching operations of the production processor, wherein the production processor is configured to receive production elements comprising the production algorithm and graphics, and wherein the method further comprises incorporating the production elements into the production elements switcher interface such that switching operations directed by the production elements switcher interface are linked to the production elements specified by the production algorithm.

17. The method of claim 16, further comprising using the production processor to dynamically update the live graphics with the golf tracking data and incorporating the live graphics into the program according to the production algorithm.

18. The method of claim 16, wherein the production elements are grouped by holes, and the method further comprises incorporating the production elements for each hole into switching operations directed by the production elements switcher interface when recalled by the production processor or a production operator.

19. The method of claim 14, wherein the production processor is configured for autonomous switching driven by event activities of the golf event that includes identifying camera sources and performing autonomous switching according to the production algorithm to assemble programs of each shot of a player or group of players throughout a round, and wherein at least one of (1) the tracking system tracks event activities and generates a signal upon the occurrence of an event activity and (a) the production processor is configured to listen for signals corresponding to event activities that trigger switching operations specified by the production algorithm or (b) occurrences of event activities are transmitted to the production processor, or (2) the production processor is configured to monitor the golf tracking data collected by the tracking system for event activities that trigger switching operations specified by the production algorithm.

20. The method of claim 19, wherein the tracking system, production processor, or combination thereof is configured with computer vision to identify players, balls, or both in video data captured on the course that is used by the production processor to drive autonomous switching operations and is preloaded with field of views of the media data collection network cameras and is configured to utilize player location, ball location data, or other event activity location to identify the camera sources capturing event activities based on the field of view and tracked location data.

21. The method of claim 20, wherein the tracking system is configured for autonomous collection of golf tracking data and utilizes computer vision to identify and track players and radar devices to detect balls in flight, swings, or both.

22. The method of claim 21, wherein the tracking system, production processor, or combination thereof is configured to employ player recognition, playing order, location of a player relative to a ball at a resting position of a previous shot by the player, location of a player relative to a ball when detected to be swinging, or combination thereof to associate players to the balls of the players.

23. The method of claim 20, wherein the production processor uses time and hole location of an occurrence of an event activity to identify the camera source corresponding to the feed of media collected at the camera position capturing the event activity and trigger switching to the camera source.

24. The method of claim 14, further comprising autonomously generating program commentary with a commentary generator, wherein the commentary generator utilizes golf tracking data, video, a large language model and one or more assets selected from competition related data, theme related data, or combination thereof to generate the commentary.

25. The method of claim 24, wherein the commentary generator is configured to generate program commentary in different points of view comprising two or more of color analysis, play analysis, or statistical analysis.

26. The method of claim 25, wherein the production platform further receives feeds of live media data captured by spectators for use by the production processor to produce programs.

27. A non-transitory computer readable medium including instructions that when executed by a processor perform the method of claim 14.

28. A method comprising:

providing an interface to a system for consumption of live event broadcasts, the interface including a plurality of live video versions of a golf event and one or more graphical versions of the golf event selectable for viewing by user devices accessing operations of the system via the interface;

receiving from a user device a media content selection comprising a one or more of the live video versions and one or more of the graphical versions; and causing the selected live video and graphical versions to be streamed to the user device for simultaneous display, in sync, within an interactive display presented on the user device.

29. The system of claim 1, wherein the system for consumption of live event broadcasts is configured to provide a user one or more selectable green views that include a display of a prediction of a successful putting line relative to a ball location of a player putting in a displayed live video version.

30. The method of claim 14, wherein the system for consumption of live event broadcasts is configured to generate one or more selectable green views that include a display of a prediction of a successful putting line relative to a ball location of a player putting in a displayed live video version.

* * * * *